US012533086B2

(12) United States Patent
Zlochiver

(10) Patent No.: US 12,533,086 B2
(45) Date of Patent: Jan. 27, 2026

(54) TECHNOLOGIES FOR DETERMINING A RISK OF DEVELOPING ATRIAL FIBRILLATION

(71) Applicant: Welch Allyn, Inc., Skaneateles, NY (US)

(72) Inventor: Sharone Zlochiver, Mequon, WI (US)

(73) Assignee: Welch Allyn, Inc., Skaneateles, NY (US)

( * ) Notice: Subject to any disclaimer, the term of this patent is extended or adjusted under 35 U.S.C. 154(b) by 507 days.

(21) Appl. No.: 18/056,421

(22) Filed: Nov. 17, 2022

(65) Prior Publication Data

US 2023/0172564 A1 Jun. 8, 2023

Related U.S. Application Data

(60) Provisional application No. 63/285,177, filed on Dec. 2, 2021.

(51) Int. Cl.
| | |
|---|---|
| *A61B 5/361* | (2021.01) |
| *A61B 5/00* | (2006.01) |
| *A61B 5/366* | (2021.01) |
| *G16H 50/30* | (2018.01) |

(52) U.S. Cl.
CPC ............ *A61B 5/7275* (2013.01); *A61B 5/361* (2021.01); *A61B 5/366* (2021.01); *G16H 50/30* (2018.01)

(58) Field of Classification Search
CPC .................................................... A61B 5/361
See application file for complete search history.

(56) References Cited

U.S. PATENT DOCUMENTS

| | | | |
|---|---|---|---|
| 8,437,839 B2 | 5/2013 | Lux | |
| 10,595,731 B2 | 3/2020 | Gopalakrishnan et al. | |
| 2016/0135702 A1 | 5/2016 | Perez | |
| 2020/0297230 A1 | 9/2020 | Thakur et al. | |
| 2020/0305713 A1 | 10/2020 | Sipe et al. | |
| 2021/0076960 A1 | 3/2021 | Fornwalt et al. | |

FOREIGN PATENT DOCUMENTS

| | | | |
|---|---|---|---|
| CN | 110226921 A | | 9/2019 |
| CN | 110960207 | * | 7/2020 |
| CN | 113456084 A | | 10/2021 |
| WO | 2021037102 A1 | | 3/2020 |

(Continued)

OTHER PUBLICATIONS

Goodfellow et al., "Classification of Atrial Fibrillation Using Mulitdisciplinary Features and Gradient Boosting", 2017, Computing in Cardiology: vol. 44. (Year: 2017).*

(Continued)

*Primary Examiner* — George R Evanisko
(74) *Attorney, Agent, or Firm* — Barnes & Thornburg LLP

(57) ABSTRACT

Technologies for determining a risk of developing atrial fibrillation may include a compute device. The compute device may include circuitry configured to obtain patient data indicative of an electrocardiogram to be analyzed for a likelihood that a corresponding patient will develop atrial fibrillation. The circuitry may also be configured to determine, based on the patient data and a prediction model that includes an ensemble of gradient boosted weak prediction submodels, the likelihood that the patient will develop atrial fibrillation.

19 Claims, 13 Drawing Sheets

(56) References Cited

FOREIGN PATENT DOCUMENTS

| WO | 2020086865 A1 | 4/2020 |
|---|---|---|
| WO | 2021121226 A1 | 6/2021 |

OTHER PUBLICATIONS

"Artificial Intelligence—Electrocardiography to Predict Incident Atrial Fibrillation a Population-Based Study," Christopoulos et al., Cir Arrhythm Electrophysiol. 2020; 13:e009355. DOI: 10.1161ICIRCEP. 120.009355. Dec. 2020; pp. 1420-1427.

"An artificial intelligence-enabled ECG algorithm for the identification of patents with atrial fibrillation during sinus rhythm: a retrospective analysis of outcome prediction," Attia et al.; Lanet 2019; 394: 861-67; www.thelancet.com; Sep. 7, 2019.

* cited by examiner

TECHNOLOGIES FOR DETERMINING A RISK OF DEVELOPING ATRIAL FIBRILLATION

CROSS-REFERENCE TO RELATED APPLICATION

This application claims the benefit, under 35 U.S.C. § 119(e), of U.S. Provisional Patent Application No. 63/285,177, filed Dec. 2, 2021, the entirety of which is hereby expressly incorporated by reference herein.

BACKGROUND

The present disclosure relates to determining the risk that a patient will develop atrial fibrillation, and more particularly to determining the risk using machine learning.

Atrial fibrillation, often referred to by the shorthand "AFib" or "AF," is the most common type of treated heart arrhythmia. When a person has atrial fibrillation, the normal beating in the upper chambers of the heart (i.e., the two atria) is irregular, and blood flow from the atria to the lower chambers of the heart (i.e., the two ventricles) is impaired. Depending on the particular person, atrial fibrillation may occur in brief episodes or it may be a permanent condition. A major concern with atrial fibrillation is the potential to develop blood clots within the upper chambers of the heart. Such blood clots are especially problematic because they have the potential to circulate to other organs and lead to blocked blood flow (i.e., ischemia) and stroke. As such, atrial fibrillation may lead to scenarios that require emergency treatment. Complicating the matter, some people with atrial fibrillation have no symptoms and are unaware of their condition until it is discovered during a physical examination. Further, many atrial fibrillation patients are not diagnosed as such prior to experiencing a life-threatening event (e.g., a stroke), that was caused by atrial fibrillation. Moreover, the incidence and prevalence of AF are increasing globally, having grown by three fold over the past fifty years. Indeed, it is estimated that 12.1 million people in the United States will have atrial fibrillation in 2030.

SUMMARY

The present application discloses one or more of the features recited in the appended claims and/or the following features which, alone or in any combination, may comprise patentable subject matter:

According to an aspect of the present disclosure, a compute device may include circuitry configured to obtain patient data indicative of an electrocardiogram to be analyzed for a likelihood that a corresponding patient will develop atrial fibrillation. The circuitry may be further configured to determine, based on the patient data and a prediction model that includes an ensemble of gradient boosted weak prediction submodels, the likelihood that the patient will develop atrial fibrillation.

The circuitry of the compute device, in some embodiments, may be configured such that determining, based on the patient data and a prediction model that includes an ensemble of gradient boosted weak prediction submodels, the likelihood that the patient will develop atrial fibrillation includes determining the likelihood that the patient will develop atrial fibrillation using a prediction model that includes an ensemble of gradient boosted decision trees. In some embodiments, the circuitry may be configured such that determining the likelihood using a prediction model that includes an ensemble of gradient boosted decision trees includes determining the likelihood using a prediction model that includes an ensemble of at least 500 gradient boosted decisions trees. Each decision tree may, in some embodiments, have a depth of at least four.

The compute device, in some embodiments, may have circuitry that is configured to determine the likelihood using a prediction model that has a differentiable loss function. In some embodiments of the compute device, the circuitry may be configured such that determining, based on the patient data and a prediction model that includes an ensemble of gradient boosted weak prediction submodels, the likelihood that the patient will develop atrial fibrillation may include determining the likelihood using a prediction model that has a Bernoulli distribution loss function. The circuitry of the compute device may be configured to determine the likelihood of the patient developing atrial fibrillation using a prediction model having a cutoff threshold indicative of a sensitivity and a specificity of the prediction model, in which the cutoff threshold is adjusted as a function of an accuracy of the prediction model. The cutoff threshold, in some embodiments, may be 0.5.

In some embodiments, the circuitry may also be configured to perform feature extraction on the patient data to produce a feature set that is indicative of one or more measured characteristics of the electrocardiogram. For example, the circuitry may be configured to produce a feature set that includes at least one global measurement associated with multiple leads monitored by an electrocardiograph corresponding to the electrocardiogram. The compute device, in some embodiments, may produce a feature set that includes at least one of an average RR, an organized index, flutter waves RR, a P-wave onset, a P-wave offset, a QRS onset, a QRS offset, a T-wave offset, a ventricular rate, a PR duration, a QRS axis, a T axis, a QT interval, or a QTc. In some embodiments, the circuitry of the compute device may be configured such that performing feature extraction includes producing a feature set that includes at least one measurement for each lead monitored by an electrocardiograph corresponding to the electrocardiogram. In doing so, in some embodiments, the circuitry may be configured to produce a feature set that includes one or more measurements for a P-wave amplitude, a P'-wave amplitude, a Q-wave duration, a Q-wave amplitude, an R-wave duration, an R-wave amplitude, an S-wave duration, an S-wave amplitude, an R'-wave duration, an R'-wave amplitude, an S'-wave duration, an S'-wave amplitude, an ST elevation at a J-point, at a midpoint, and at an end of an ST point, a T-wave amplitude, a T'-wave amplitude, or a QRS amplitude.

In some embodiments, the circuitry may be configured to produce a feature set that includes interpretation statements generated by a rule-based algorithm that analyzes statistics of electrocardiograms. Additionally or alternatively, the circuitry may be configured to produce a feature set that includes at least one of an age or a gender of the patient. In some embodiments, the circuitry of the compute device is configured to train the prediction model. In doing so, the circuitry may be configured to obtain training data indicative of electrocardiograms for multiple people. Further, the circuitry may be configured to produce, from the training data, feature set data indicative of measured characteristics of each of the electrocardiograms and train the prediction model based on the training data. The circuitry, in some embodiments, may be configured such that obtaining the training data includes obtaining electrocardiograms for a set of people who were subsequently diagnosed with atrial fibrillation by a medical practitioner (e.g., a physician). In doing so, the circuitry may be configured to exclude, from the electrocardiograms for the set of people who were subsequently diagnosed with atrial fibrillation, electrocardiograms that resulted in the diagnoses of atrial fibrillation. The circuitry of the compute device may be configured to exclude, from the electrocardiograms for the set of people who were subsequently diagnosed with atrial fibrillation, electrocardiograms indicative of one or more predefined reference features present in a data set of features known to be associated with atrial fibrillation.

The circuitry of the compute device, in some embodiments, may be configured to select, for inclusion in the training data, the most recent electrocardiogram that did not result in a diagnosis of atrial fibrillation for a corresponding person. Additionally or alternatively, the circuitry may be configured to obtain a set of testing data indicative of electrocardiograms for people without atrial fibrillation and electrocardiograms for people diagnosed with atrial fibrillation. In some embodiments, the circuitry may be configured to obtain the training data and testing data in a ratio of approximately 70 to 30. The circuitry may be configured such that producing, from the training data, feature set data indicative of measured characteristics of each of the electrocardiograms includes producing feature set data that includes one or more global measurements associated with multiple leads monitored by a corresponding electrocardiograph. The circuitry, in some embodiments, may be configured to produce feature set data includes one or more of an average RR, an organized index, flutter waves RR, a P-wave onset, a P-wave offset, a QRS onset, a QRS offset, a T-wave offset, a ventricular rate, a PR duration, a QRS axis, a T axis, a QT interval, or a QTc.

The circuitry of the compute device, in some embodiments, may be configured to produce, from the training data, a feature set that includes one or more measurements for each lead monitored by a corresponding electrocardiograph. In some embodiments of the compute device, the circuitry may be configured such that producing a feature set that includes one or more measurements for each lead monitored by a corresponding electrocardiograph includes producing a feature set that includes one or more measurements for a P-wave amplitude, a P'-wave amplitude, a Q-wave duration, a Q-wave amplitude, an R-wave duration, an R-wave amplitude, an S-wave duration, an S-wave amplitude, an R'-wave duration, an R'-wave amplitude, an S'-wave duration, an S'-wave amplitude, an ST elevation at a J-point, at a midpoint, and at an end of an ST point, a T-wave amplitude, a T'-wave amplitude, or a QRS amplitude.

In some embodiments, the circuitry of the compute device may be configured to produce feature set data that includes at least one interpretation statement generated by a rule-based algorithm that analyzes statistics of electrocardiograms. For example, the circuitry may be configured to produce feature set data that includes an interpretation statement representing a human-readable description of one or more characteristics of a corresponding electrocardiogram. The circuitry may also be configured to produce feature set data that includes an age or a gender of a person associated with at least one of the electrocardiograms. In some embodiments, the circuitry may be configured to train the prediction model as a machine learning model that includes an ensemble of decision trees using gradient boosting. The compute device, in some embodiments, may have circuitry that is configured to train the prediction model as a machine learning model with 500 decision trees, with each tree having a depth of four. In some embodiments, the compute device may train the prediction model as a machine learning model that enables adjustments of a differentiable loss function, such as a Bernoulli distribution loss function.

The compute device may have circuitry that is configured to perform training of the prediction model using ten fold cross validation of the training data. In some embodiments, the circuitry of the compute device may be configured to adjust, as a function of a determined prediction accuracy of the prediction model, a cutoff threshold indicative of a balance between sensitivity and specificity of the prediction model, to increase an accuracy of the prediction model. For example, in some embodiments, the circuitry may be configured to adjust the cutoff threshold to a value of 0.5.

In another aspect of the present disclosure, a method may include obtaining, by a compute device, patient data indicative of an electrocardiogram to be analyzed for a likelihood that a corresponding patient will develop atrial fibrillation. The method may additionally include determining, by the compute device and based on the patient data and a prediction model that includes an ensemble of gradient boosted weak prediction submodels, the likelihood that the patient will develop atrial fibrillation.

In some embodiments, determining, based on the patient data and a prediction model that includes an ensemble of gradient boosted weak prediction submodels, the likelihood that the patient will develop atrial fibrillation includes determining the likelihood that the patient will develop atrial fibrillation using a prediction model that includes an ensemble of gradient boosted decision trees. The method may, in some embodiments, include determining the likelihood using a prediction model that includes an ensemble of at least 500 gradient boosted decisions trees, in which each decision tree may have a depth of at least four.

In some embodiments, determining, based on the patient data and a prediction model that includes an ensemble of gradient boosted weak prediction submodels, the likelihood that the patient will develop atrial fibrillation includes determining the likelihood using a prediction model that has a differentiable loss function. Determining the likelihood that the patient will develop atrial fibrillation may include determining the likelihood using a prediction model that has a Bernoulli distribution loss function.

In some embodiments, determining the likelihood that the patient will develop atrial fibrillation includes determining the likelihood using a prediction model having a cutoff threshold indicative of a sensitivity and a specificity of the prediction model. The cutoff threshold may be adjusted as a function of an accuracy of the prediction model. In some embodiments, the cutoff threshold is equal to 0.5. The method may additionally include performing, by the compute device, feature extraction on the patient data to produce a feature set that is indicative of one or more measured characteristics of the electrocardiogram. Performing the feature extraction may include producing a feature set that includes at least one global measurement associated with multiple leads monitored by an electrocardiograph corresponding to the electrocardiogram.

In some embodiments, producing a feature set that includes at least one global measurement includes producing a feature set that includes at least one of an average RR, an organized index, flutter waves RR, a P-wave onset, a P-wave offset, a QRS onset, a QRS offset, a T-wave offset, a ventricular rate, a PR duration, a QRS axis, a T axis, a QT interval, or a QTc. Performing feature extraction may, in some embodiments of the method, include producing a feature set that includes at least one measurement for each lead monitored by an electrocardiograph corresponding to the electrocardiogram. Producing a feature set that includes at least one measurement for each lead monitored by an electrocardiograph corresponding to the electrocardiogram may, in some embodiments, include producing a feature set that includes one or more measurements for a P-wave amplitude, a P'-wave amplitude, a Q-wave duration, a Q-wave amplitude, an R-wave duration, an R-wave amplitude, an S-wave duration, an S-wave amplitude, an R'-wave duration, an R'-wave amplitude, an S'-wave duration, an S'-wave amplitude, an ST elevation at a J-point, at a midpoint, and at an end of an ST point, a T-wave amplitude, a T'-wave amplitude, or a QRS amplitude. In some embodiments, producing a feature set includes producing a feature set that includes interpretation statements generated by a rule-based algorithm that analyzes statistics of electrocardiograms. The feature set may additionally include an age and/or a gender of the patient.

The method may additionally include training, by the compute device, the prediction model. In some embodiments, the method may include obtaining, by the compute device, training data indicative of electrocardiograms for multiple people. The method may also include producing, by the compute device and from the training data, feature set data indicative of measured characteristics of each of the electrocardiograms and training, by the compute device, the prediction model based on the training data.

In some embodiments, obtaining the training data may include obtaining electrocardiograms for a set of people who were subsequently diagnosed with atrial fibrillation by a medical practitioner. The compute device may, in some embodiments of the method, exclude, from the electrocardiograms for the set of people who were subsequently diagnosed with atrial fibrillation, electrocardiograms that resulted in the diagnoses of atrial fibrillation. The method may include excluding, by the compute device and from the electrocardiograms for the set of people who were subsequently diagnosed with atrial fibrillation, electrocardiograms indicative of one or more predefined reference features present in a data set of features known to be associated with atrial fibrillation.

The method may include selecting, by the compute device and for inclusion in the training data, the most recent electrocardiogram that did not result in a diagnosis of atrial fibrillation for a corresponding person. Additionally or alternatively, the method may include obtaining, by the compute device, a set of testing data indicative of electrocardiograms for people without atrial fibrillation and electrocardiograms for people diagnosed with atrial fibrillation. In some embodiments, the method includes obtaining, by the compute device, the training data and testing data in a ratio of approximately 70 to 30.

In some embodiments, producing, by the compute device and from the training data, feature set data indicative of measured characteristics of each of the electrocardiograms includes producing feature set data that includes one or more global measurements associated with multiple leads monitored by a corresponding electrocardiograph. Producing feature set data that includes one or more global measurements may include providing feature set data having one or more of an average RR, an organized index, flutter waves RR, a P-wave onset, a P-wave offset, a QRS onset, a QRS offset, a T-wave offset, a ventricular rate, a PR duration, a QRS axis, a T axis, a QT interval, or a QTc. Producing, from the training data, feature set data indicative of measured characteristics of each of the electrocardiograms may include producing a feature set that includes one or more measurements for each lead monitored by a corresponding electrocardiograph.

In some embodiments, producing a feature set that includes one or more measurements for each lead monitored by a corresponding electrocardiograph includes producing a feature set that includes one or more measurements for a P-wave amplitude, a P'-wave amplitude, a Q-wave duration, a Q-wave amplitude, an R-wave duration, an R-wave amplitude, an S-wave duration, an S-wave amplitude, an R'-wave duration, an R'-wave amplitude, an S'-wave duration, an S'-wave amplitude, an ST elevation at a J-point, at a midpoint, and at an end of an ST point, a T-wave amplitude, a T'-wave amplitude, or a QRS amplitude. Producing feature set data indicative of measured characteristics of each of the electrocardiograms may include producing feature set data that includes at least one interpretation statement generated by a rule-based algorithm that analyzes statistics of electrocardiograms. In some embodiments, producing feature set data that includes at least one interpretation statement includes producing feature set data that includes at least one interpretation statement representing a human-readable description of one or more characteristics of a corresponding electrocardiogram.

In some embodiments, producing, from the training data, feature set data includes producing feature set data that includes at least one of an age or a gender of a person associated with at least one of the electrocardiograms. Training the prediction model, in some embodiments, may include training the prediction model as a machine learning model that includes an ensemble of decision trees using gradient boosting. In some embodiments, training the prediction model includes training the prediction model as a machine learning model with 500 decision trees, with each tree having a depth of four.

Training the prediction model, in some embodiments, includes training the prediction model as a machine learning model that enables adjustments of a differentiable loss function. For example, the method may include training the prediction model as a machine learning model with a Bernoulli distribution loss function. In some embodiments, training the prediction model includes performing training using ten fold cross validation of the training data. Training the prediction model may include adjusting, as a function of a determined prediction accuracy of the prediction model, a cutoff threshold indicative of a balance between sensitivity and specificity of the prediction model to increase an accuracy of the prediction model. In some embodiments, the cutoff threshold may be adjusted to a value of 0.5.

In another aspect of the present disclosure, one or more machine-readable storage media may include a set of instructions stored thereon that, in response to being executed, may cause a compute device to obtain patient data. The patient data may be indicative of an electrocardiogram to be analyzed for a likelihood that a corresponding patient will develop atrial fibrillation. The instructions may additionally cause the compute device to determine, based on the patient data and a prediction model that includes an ensemble of gradient boosted weak prediction submodels, the likelihood that the patient will develop atrial fibrillation.

In some embodiments, the instructions may cause the compute device to determine the likelihood that the patient will develop atrial fibrillation using a prediction model that includes an ensemble of gradient boosted decision trees. The instructions may cause the compute device to determine the likelihood using a prediction model that includes an ensemble of at least 500 gradient boosted decisions trees. Each decision tree may have a depth of at least four. The machine-readable storage media, may, in some embodiments, include instructions that cause the compute device to determine the likelihood that the patient will develop atrial fibrillation using a prediction model that has a differentiable loss function. The differentiable loss function may be a Bernoulli distribution loss function.

In some embodiments, the instructions cause the compute device to determine the likelihood using a prediction model having a cutoff threshold indicative of a sensitivity and a specificity of the prediction model. The cutoff threshold may be adjusted as a function of an accuracy of the prediction model. The cutoff threshold may be equal to 0.5. In some embodiments, the instructions may cause the compute device to perform feature extraction on the patient data to produce a feature set that is indicative of one or more measured characteristics of the electrocardiogram.

Performing feature extraction may include producing a feature set that has at least one global measurement associated with multiple leads monitored by an electrocardiograph corresponding to the electrocardiogram. The global measurements may include an average RR, an organized index, flutter waves RR, a P-wave onset, a P-wave offset, a QRS onset, a QRS offset, a T-wave offset, a ventricular rate, a PR duration, a QRS axis, a T axis, a QT interval, or a QTc. The instructions may additionally or alternatively cause the compute device to produce a feature set that includes at least one measurement for each lead monitored by an electrocardiograph corresponding to the electrocardiogram. For example, the instructions may cause the compute device to produce a feature set that includes, for each lead, one or more of a P-wave amplitude, a P'-wave amplitude, a Q-wave duration, a Q-wave amplitude, an R-wave duration, an R-wave amplitude, an S-wave duration, an S-wave amplitude, an R'-wave duration, an R'-wave amplitude, an S'-wave duration, an S'-wave amplitude, an ST elevation at a J-point, at a midpoint, and at an end of an ST point, a T-wave amplitude, a T'-wave amplitude, or a QRS amplitude.

In some embodiments, the instructions may cause the compute device to produce a feature set that includes interpretation statements generated by a rule-based algorithm that analyzes statistics of electrocardiograms. Additionally or alternatively, the instructions may cause the compute device to produce a feature set that includes at least one of an age or a gender of the patient. The instructions may also cause the compute device to train the prediction model. For example, the instructions may cause the compute device to obtain training data indicative of electrocardiograms for multiple people, produce, from the training data, feature set data indicative of measured characteristics of each of the electrocardiograms, and train the prediction model based on the training data.

In some embodiments, the instructions cause the compute device to obtain electrocardiograms for a set of people who were subsequently diagnosed with atrial fibrillation by a medical practitioner. The instructions may additionally cause the compute device to exclude, from the electrocardiograms for the set of people who were subsequently diagnosed with atrial fibrillation, electrocardiograms that resulted in the diagnoses of atrial fibrillation. Further, the instructions may cause the compute device to exclude, from the electrocardiograms for the set of people who were subsequently diagnosed with atrial fibrillation, electrocardiograms indicative of one or more predefined reference features present in a data set of features known to be associated with atrial fibrillation.

The instructions, when executed, may cause the compute device to select, for inclusion in the training data, the most recent electrocardiogram that did not result in a diagnosis of atrial fibrillation for a corresponding person. In some embodiments, the instructions may cause the compute device to obtain a set of testing data indicative of electrocardiograms for people without atrial fibrillation and electrocardiograms for people diagnosed with atrial fibrillation. In doing so, the instructions may cause the compute device to obtain the training data and testing data in a ratio of approximately 70 to 30.

The instructions may cause the compute device to produce, from the training data, feature set data indicative of measured characteristics of each of the electrocardiograms including one or more global measurements associated with multiple leads monitored by a corresponding electrocardiograph. The one or more global measurements may include one or more of an average RR, an organized index, flutter waves RR, a P-wave onset, a P-wave offset, a QRS onset, a QRS offset, a T-wave offset, a ventricular rate, a PR duration, a QRS axis, a T axis, a QT interval, or a QTc.

The instructions may also cause the compute device to produce feature set data indicative of measured characteristics of each of the electrocardiograms including one or more measurements for each lead monitored by a corresponding electrocardiograph. The one or more measurements for each lead monitored by a corresponding electrocardiograph may include one or more measurements for a P-wave amplitude, a P'-wave amplitude, a Q-wave duration, a Q-wave amplitude, an R-wave duration, an R-wave amplitude, an S-wave duration, an S-wave amplitude, an R'-wave duration, an R'-wave amplitude, an S'-wave duration, an S'-wave amplitude, an ST elevation at a J-point, at a midpoint, and at an end of an ST point, a T-wave amplitude, a T'-wave amplitude, or a QRS amplitude.

In some embodiments, the instructions may cause the compute device to produce feature set data that includes at least one interpretation statement generated by a rule-based algorithm that analyzes statistics of electrocardiograms. The at least one interpretation statement may represent a human-readable description of one or more characteristics of a corresponding electrocardiogram. The instructions may also cause the compute device to produce feature set data that includes at least one of an age or a gender of a person associated with at least one of the electrocardiograms.

In some embodiments, the instructions may cause the compute device to train the prediction model as a machine learning model that includes an ensemble of decision trees using gradient boosting. The instructions may cause the compute device to train the prediction model as a machine learning model with 500 decision trees. Each decision tree may have a depth of four.

When executed, the instructions, in some embodiments, may cause the compute device to train the prediction model as a machine learning model that enables adjustments of a differentiable loss function. The prediction model may be a machine learning model with a Bernoulli distribution loss function. In some embodiments, the instructions may cause the compute device to train the prediction model using ten fold cross validation of the training data. The instructions may cause the compute device to adjust, as a function of a determined prediction accuracy of the prediction model, a cutoff threshold indicative of a balance between sensitivity and specificity of the prediction model to increase an accuracy of the prediction model. In some embodiments, the instructions may cause the compute device to adjust the cutoff threshold to a value of 0.5.

Additional features, which alone or in combination with any other feature(s), such as those listed above and/or those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
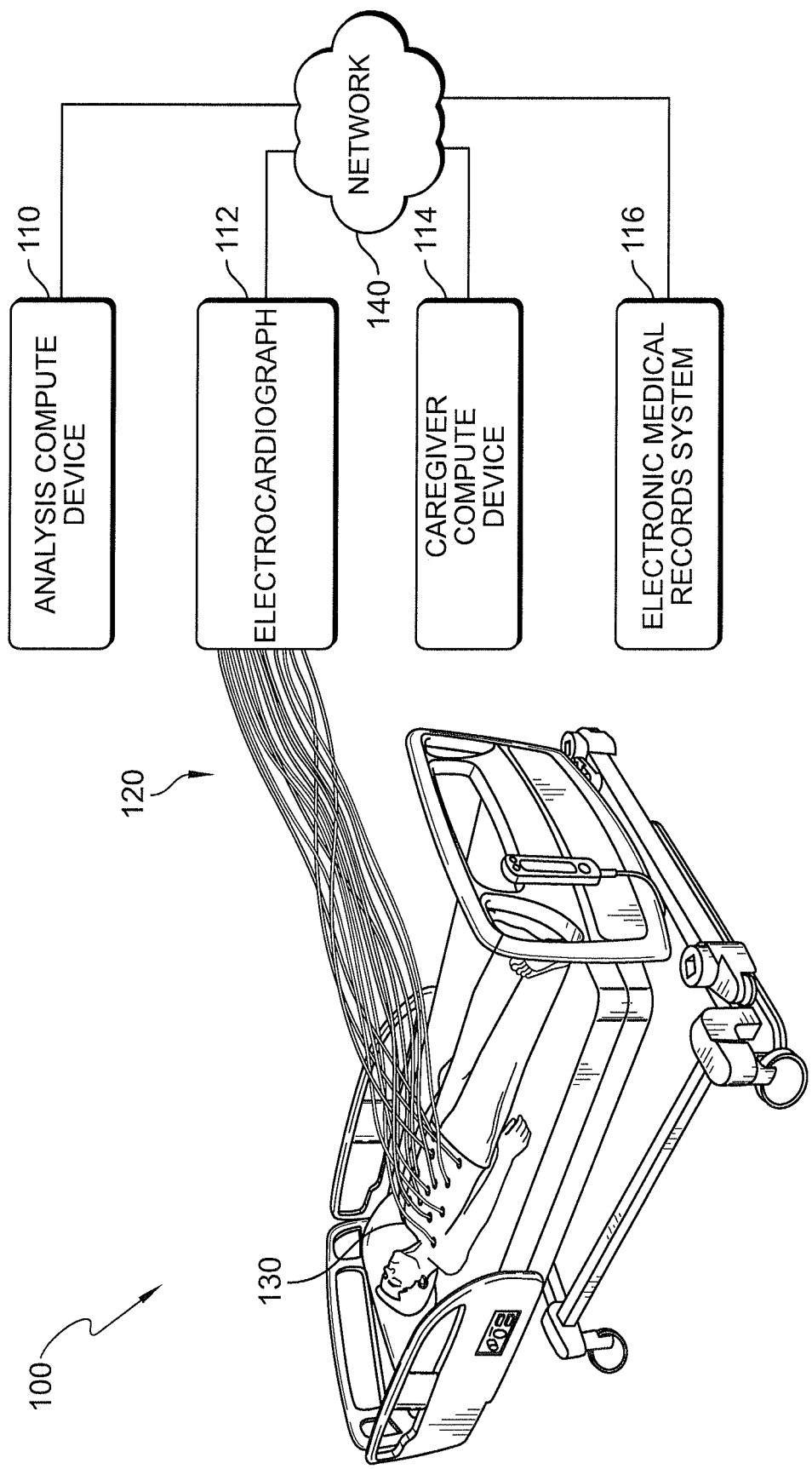
FIG. 1 is a diagram of a system for determining the likelihood that a patient will develop atrial fibrillation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for determining the likelihood that a patient 130 will develop atrial fibrillation includes an analysis compute device 110 and an electrocardiograph 112. In the illustrative embodiment, the system 100 also includes a caregiver compute device 114 and an electronic medical records (EMR) system 116. While one analysis compute device 110, one electrocardiograph 112, and one caregiver compute device 114 are shown in FIG. 1 for simplicity, it should be understood that the quantity of each device may vary from one embodiment to another. Furthermore, while shown as separate devices, in some embodiments, one or more of the devices may be incorporated into (e.g., within the same housing as) another device. For example, in some embodiments, the electrocardiograph 112 may be incorporated into the analysis compute device 110 and/or the analysis compute device 110 may be incorporated into the caregiver compute device 114.

The electrocardiograph 112, also referred to as an "ECG" or "EKG," is embodied as a device capable of producing data (i.e., an electrocardiograph) indicative of detected voltages over time of electrical activity of a heart, using multiple electrodes on the skin of a patient (e.g., the patient 130). In the illustrative embodiment, the electrocardiograph 112 receives electrical signals from ten electrodes 120 placed at prescribed locations on the body of the patient 130. The electrocardiograph 112, in the illustrative embodiment, produces the electrocardiogram based on electrical signals produced by the patient 130 under resting conditions. That is, the magnitude of the heart's electrical potential is measured by the electrocardiograph 112 from twelve different angles ("leads") over a predefined period of time (e.g., ten seconds) to capture the magnitude and direction of the electrical depolarization of the heart throughout a cardiac cycle.

The analysis compute device 110, in the illustrative embodiment, is configured to obtain patient data indicative of an electrocardiogram (e.g., an electrocardiogram produced by the electrocardiograph 112) and determine, based on the patient data and a prediction model, the likelihood (e.g., risk, probability, etc.) that the corresponding patient (e.g., the patient 130) will develop atrial fibrillation in the future. The traces of a resting electrocardiogram provide a snapshot of the atrial and ventricular well-being, both anatomically and electro-physiologically, of the corresponding patient. While conventional rule-based methodologies may diagnose existing cardiac pathologies and conduction abnormalities via electrocardiogram interpretation, such methodologies are not used to predict the risk of various specific cardiac pathologies, such as atrial fibrillation. By contrast, the prediction model utilized by the analysis compute device 110 enables the classification of patients into low and high risk of developing atrial fibrillation in the future, using conventional twelve-lead resting electrocardiogram information as an input.

The prediction model operates on the principle that the anatomical and electro-physiological factors that support the formation of atrial fibrillation develop gradually and those gradual developments can be recorded in standard resting electrocardiograms. As described in more detail herein, the prediction model is trained based on sets of electrocardiograms from people who were subsequently diagnosed (e.g., by a human physician) as having atrial fibrillation and other people who were not diagnosed with atrial fibrillation. In the illustrative embodiment, the prediction model is a gradient boosted prediction model that operates on (e.g., generates predictions based on) features extracted from the obtained patient data (e.g., from the electrocardiogram(s)). That is, the prediction model includes an ensemble of weak prediction submodels (e.g., decision trees) to determine, based on features extracted from the obtained patient data (e.g., global information such as average RR (e.g., interval between R-waves), P-wave onset, P-wave offset, QRS onset, and/or QRS offset, per-lead measurements, such as P-wave amplitude, P'-wave amplitude, Q-wave duration, Q-wave amplitude, etc., and/or interpretation statements generated by a rule-based algorithm that analyzes statistics of electrocardiograms), the likelihood that the patient will develop atrial fibrillation. By utilizing the gradient boosted prediction model rather than a conventional machine learning model, such as a neural network, the analysis compute device 110 may operate more efficiently (e.g., requiring less processing time, less energy, less circuitry, etc.) than if a conventional machine learning model was used, and the logic (e.g., determinations made by decision trees) upon which the predictions are made can be more readily understood by a human.

The caregiver compute device 114 may be embodied as any device utilized by a caregiver (e.g., a physician, a nurse, etc.) to present and/or receive information. In some embodiments, the caregiver compute device 114 may receive (e.g., from the analysis compute device 110) information indicative of the determined likelihood that a particular patient (e.g., the patient 130) will develop atrial fibrillation. In response, the user of the caregiver compute device 114 (e.g., physician, nurse, etc.) may act upon the information, such as by ordering additional tests and/or placing the patient on a treatment program to lower the risk of developing atrial fibrillation. The electronic medical records system 116 may be embodied as any device or set of devices capable of storing and retrieving, on an as-requested basis, medical record information associated with one or more patients (e.g., the patient 130). As such, in the illustrative embodiment, the analysis compute device 110 may send information indicative of the determined likelihood that a given patient (e.g., the patient 130) will develop atrial fibrillation to the electronic medical records system 116 for storage therein. Additionally, electrocardiogram information may be sent from the electrocardiograph 112 to the electronic medical records system 116 and retrieved therefrom by another device (e.g., the analysis compute device 110, the caregiver compute device 114, etc.).

Figure 2:
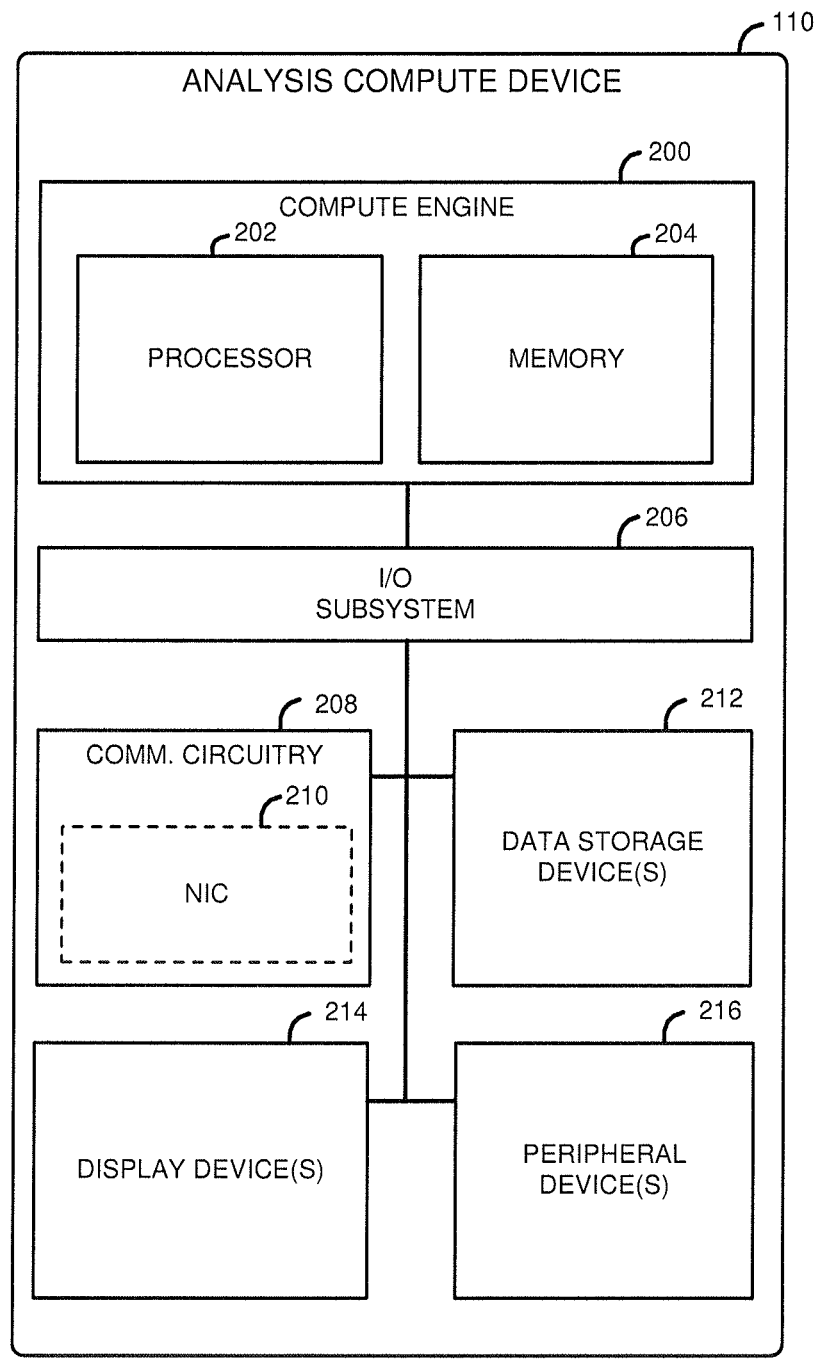
FIG. 2 is a diagram of components of an analysis compute device included in the system of FIG. 1.

Referring now to FIG. 2, the illustrative analysis compute device 110 includes a compute engine 200, an input/output (I/O) subsystem 206, communication circuitry 208, and a data storage subsystem 212. In the illustrative embodiment, the analysis compute device 110 also includes one or more display devices 214 and one or more peripheral devices 216 (e.g., a keyboard, a mouse, speaker(s), etc.). Additionally, in some embodiments, one or more of the illustrative components may be incorporated in, or otherwise form a portion of, another component.

The compute engine 200 may be embodied as any type of device or collection of devices capable of performing various compute functions described below. In some embodiments, the compute engine 200 may be embodied as a single device such as an integrated circuit, an embedded system, a field-programmable gate array (FPGA), a system-on-a-chip (SOC), or other integrated system or device. Additionally, in the illustrative embodiment, the compute engine 200 includes or is embodied as a processor 202 and a memory 204. The processor 202 may be embodied as any type of processor capable of performing the functions described herein. For example, the processor 202 may be embodied as a single or multi-core processor(s), a microcontroller, or other processor or processing/controlling circuit. In some embodiments, the processor 202 may be embodied as, include, or be coupled to an FPGA, an application specific integrated circuit (ASIC), reconfigurable hardware or hardware circuitry, or other specialized hardware to facilitate performance of the functions described herein.

The main memory 204 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 204 may be integrated into the processor 202. In operation, the main memory 204 may store various software and data used during operation such as patient data, one or more electrocardiograms, feature set(s) extracted from electrocardiogram data, training data, a prediction model, determinations of likelihood(s) of patient (s) for developing atrial fibrillation, applications, libraries, and drivers.

The compute engine 200 is communicatively coupled to other components of the analysis compute device 110 via the I/O subsystem 206, which may be embodied as circuitry and/or components to facilitate input/output operations with the compute engine 200 (e.g., with the processor 202 and the main memory 204) and other components of the analysis compute device 110. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the processor 202, the main memory 204, and other components of the analysis compute device 110, into the compute engine 200.

The communication circuitry 208 may be embodied as any communication circuit, device, or collection thereof, capable of enabling communications over a network between the analysis compute device 110 and another device (e.g., the electrocardiograph 112, the caregiver compute device 114, the electronic medical records system 116, etc.). The communication circuitry 208 may be configured to use any one or more communication technology (e.g., wired or wireless communications) and associated protocols (e.g., Ethernet, Wi-Fi®, WiMAX, Bluetooth®, cellular, etc.) to effect such communication.

The illustrative communication circuitry 208 includes a network interface controller (NIC) 210. The NIC 210 may be embodied as one or more add-in-boards, daughter cards, network interface cards, controller chips, chipsets, or other devices that may be used by the analysis compute device 110 to connect with another compute device (e.g., the electrocardiograph 112, the caregiver compute device 114, the electronic medical records system 116, etc.). In some embodiments, the NIC 210 may be embodied as part of a system-on-a-chip (SoC) that includes one or more processors, or included on a multichip package that also contains one or more processors. In some embodiments, the NIC 210 may include a local processor (not shown) and/or a local memory (not shown) that are both local to the NIC 210. In such embodiments, the local processor of the NIC 210 may be capable of performing one or more of the functions of the compute engine 200 described herein. Additionally or alternatively, in such embodiments, the local memory of the NIC 210 may be integrated into one or more components of the analysis compute device 110 at the board level, socket level, chip level, and/or other levels.

Each data storage device 212, may be embodied as any type of device configured for short-term or long-term storage of data such as, for example, memory devices and circuits, memory cards, hard disk drives, solid-state drives, or other data storage device. Each data storage device 212 may include a system partition that stores data and firmware code for the data storage device 212 and one or more operating system partitions that store data files and executables for operating systems. While shown as a single unit, it should be appreciated that the components of the analysis compute device 110 may, in some embodiments, be distributed across multiple physical locations (e.g., multiple racks in a data center). Further, one or more of the components may be virtualized (e.g., in a virtual machine executing on one or more physical compute devices).

Each display device 214 may be embodied as any device or circuitry (e.g., a liquid crystal display (LCD), a light emitting diode (LED) display, a cathode ray tube (CRT) display, etc.) configured to display visual information (e.g., text, graphics, etc.). In some embodiments, a display device 214 may be embodied as a touch screen (e.g., a screen incorporating resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors) to detect selections of on-screen user interface elements or gestures from a user.

The electrocardiogram 112, the caregiver compute device 114, and the electronic medical records system 116 may have components similar to those described in FIG. 2 with reference to the analysis compute device 110. The description of those components of the analysis compute device 110 is equally applicable to the description of components of the electrocardiogram 112, the caregiver compute device 114, and the electronic medical records system 116. Further, it should be appreciated that any of the devices 110, 112, 114, 116 may include other components, sub-components, and devices commonly found in computing devices, which are not discussed above in reference to the analysis compute device 110 and not discussed herein for clarity of the description.

In the illustrative embodiment, the analysis compute device 110, the electrocardiograph 112, the caregiver compute device 114, and the electronic medical records system 116 are in communication via a network 140, which may be embodied as any type of wired or wireless communication network, including local area networks (LANs) or wide area networks (WANs), digital subscriber line (DSL) networks, cable networks (e.g., coaxial networks, fiber networks, etc.), cellular networks (e.g., Global System for Mobile Communications (GSM), Long Term Evolution (LTE), Worldwide Interoperability for Microwave Access (WiMAX), 3G, 4G, 5G, etc.), radio area networks (RAN), global networks (e.g., the internet), or any combination thereof, including gateways between various networks.

Figure 3:
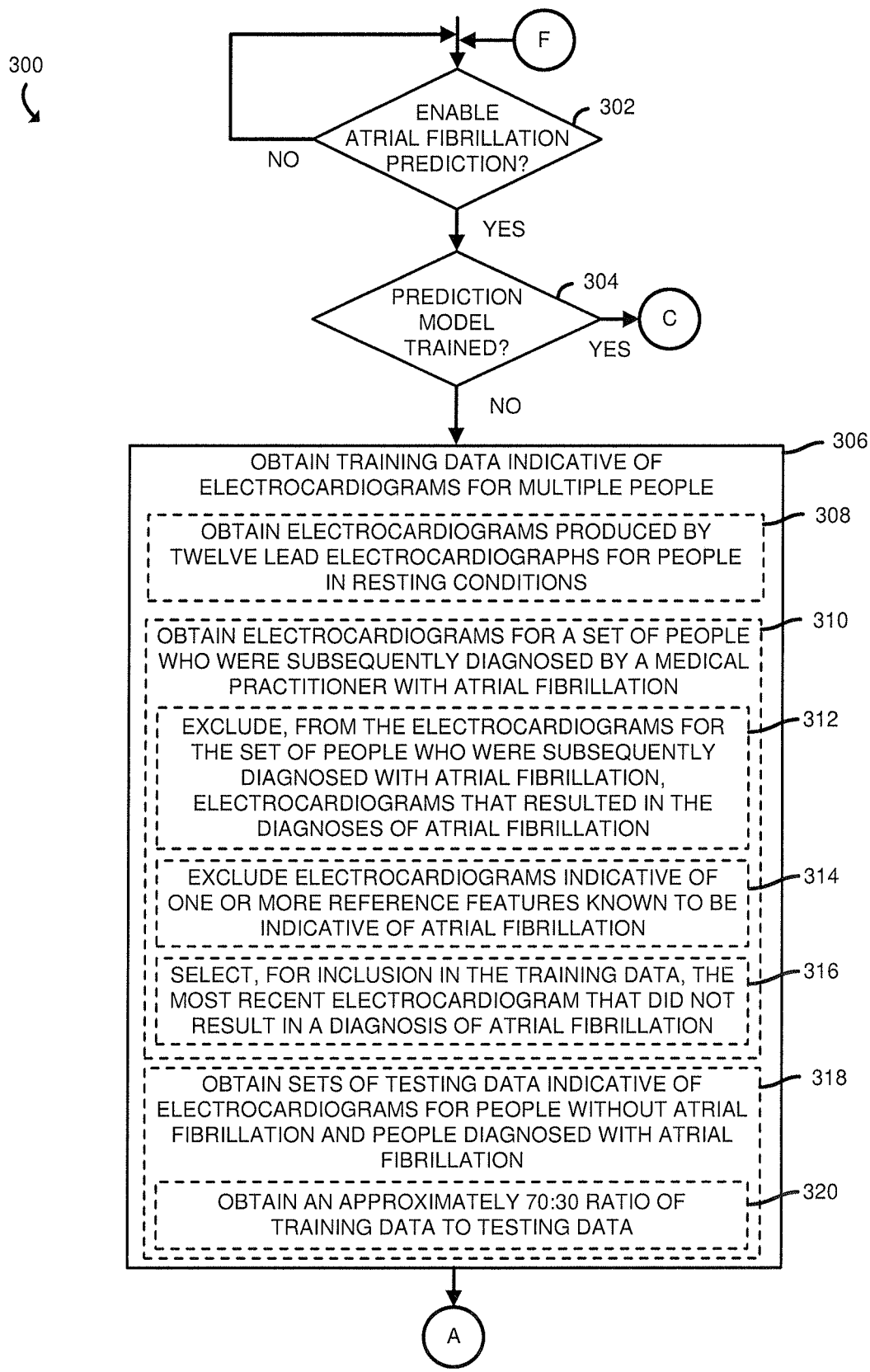
FIGS. 3-8 are diagrams of at least one embodiment of a method for determining the likelihood that a patient will develop atrial fibrillation that may be performed by the system of FIG. 1.

Referring now to FIG. 3, the system 100, and in particular, the analysis compute device 110, may perform a method 300 for determining the likelihood (i.e., risk) that a patient will develop atrial fibrillation. In the illustrative embodiment, the method 300 begins with block 302, in which the analysis compute device 110 determines whether to enable atrial fibrillation prediction (i.e., determination of the likelihood that a patient will develop atrial fibrillation). In doing so, the analysis compute device 110 may determine to enable atrial fibrillation prediction in response to a determination that a configuration setting (e.g., in the memory 204) indicates to do so, in response to a request to do so (e.g., a request sent from the caregiver compute device 114), and/or based on other factors. Regardless, in response to a determination to enable atrial fibrillation prediction, the method 300 advances to block 304, in which the analysis compute device 110 determines whether a prediction model (e.g., in the memory 204 and/or storage 212) usable by the analysis compute device 110 for predicting the likelihood that a patient will develop atrial fibrillation has been trained (e.g., as indicated by a flag set in memory 204 indicating that the prediction model is trained, a pointer to a location in the memory 204 for a data structure or algorithm associated with the prediction model, etc.). In response to a determination that the prediction model is trained, the method 300 advances to block 366 of FIG. 6, in which the analysis compute device 110 obtains patient data indicative of an electrocardiogram to be analyzed for a likelihood that the corresponding patient will develop atrial fibrillation. Otherwise, in response to a determination that the prediction model has not been trained, the method 300 advances to block 306, in which the analysis compute device 110 obtains training data (e.g., from the electronic medical records system 116 and/or from another source) indicative of electrocardiograms for multiple people.

Figure 9:
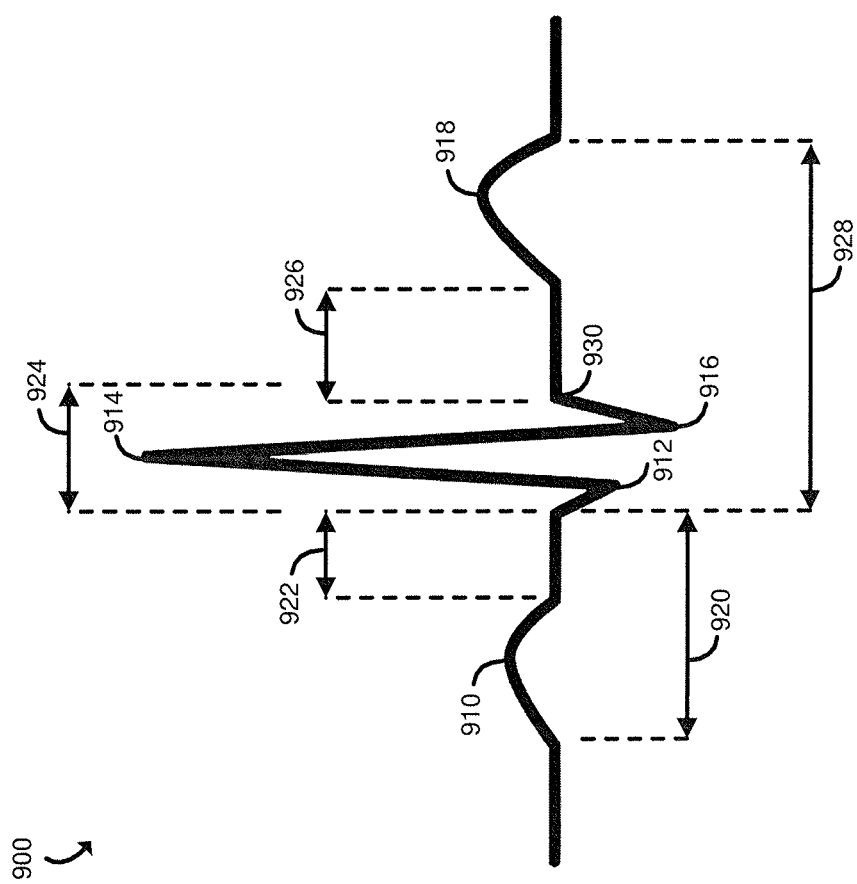
FIG. 9 is a diagram of an electrocardiogram that may be analyzed by the system of FIG. 1 to determine the likelihood that the corresponding patient will develop atrial fibrillation.

Referring briefly to FIG. 9, an embodiment of an electrocardiogram 900 is illustrated. The electrocardiogram 900 represents voltage versus time for the electrical activity of a patient's heart. The changes in voltage result from cardiac muscle depolarization followed by repolarization during each heartbeat. One significant component of an electrocardiogram (e.g., the electrocardiogram 900) is a P-wave 910 which represents depolarization of the atria. Another significant component is a QRS complex 924, which includes a Q-wave 912, an R-wave 914, and an S-wave 916, and represents the depolarization of the ventricles. Yet another major component is a T-wave 918, which represents repolarization of the ventricles. A PR interval 920 is the period that extends from the beginning of the P wave 910 to the beginning of the QRS complex 924. A portion known as the PR segment 922, which is typically flat in the absence of a heart abnormality, represents the voltage between the end of the P-wave 910 and beginning of the QRS complex 924. An ST segment 926 connects the QRS complex 924 and the T-wave 918 and is usually isoelectric in the absence of a heart abnormality. Additionally, a QT interval 928 extends from the beginning of the QRS complex 924 to the end of the T-wave 918. A corrected QT interval (QTc) is the QT interval divided by the square root of an RR interval (e.g., time period between R-waves). A J-point 930 is the point at which the QRS complex 924 ends and the ST segment 926 begins. As known in the art, a wave of a particular type (e.g., an R-wave) may be followed by one or more subsequent waves of the same type. Each of the subsequent waves are referred to with a prime (i.e., an apostrophe, such as an R'-wave), a double prime (i.e., two apostrophes, such as an R"-wave), etc. to designate the position of the corresponding wave in the sequence.

Referring back to FIG. 3, as indicated in block 308, in the illustrative embodiment, the analysis compute device 110 obtains electrocardiograms produced by twelve lead electrocardiographs (e.g., electrocardiographs that measure electrical signals for twelve leads) for people in resting conditions. In obtaining the training data, and as indicated in block 310, the analysis compute device 110, in the illustrative embodiment, obtains electrocardiograms for a set of people who were subsequently diagnosed, by a medical practitioner (e.g., a caregiver such as a physician), with atrial fibrillation. In the illustrative embodiment, the analysis compute device 110 excludes, from the electrocardiograms for the set of people who were subsequently diagnosed with atrial fibrillation, electrocardiograms that results in the diagnoses of atrial fibrillation, as indicated in block 312. That is, the training data does not include the electrocardiograms having indicia used by medical practitioners to identify atrial fibrillation. By excluding, from the training data, the electrocardiograms having the indications typically relied on by medical practitioners to diagnose a person with atrial fibrillation, the prediction model may instead be trained based on features that are present in electrocardiograms that precede cases of atrial fibrillation (e.g., to train the mode to predict future cases of atrial fibrillation rather than to merely identify existing cases of atrial fibrillation).

As indicated in block 314, the analysis compute device 110 excludes electrocardiograms indicative of one or more predefined reference features known (e.g., in medical literature, in a data set of reference features identified as being associated with atrial fibrillation, etc.) to be indicative of atrial fibrillation (e.g., to train the prediction model to identify precursors to atrial fibrillation rather than conventional indications of existing cases of atrial fibrillation). In the illustrative embodiment, the analysis compute device 110 selects, for inclusion in the training data, the most recent electrocardiograph (e.g., for each patient that was subsequently diagnosed with atrial fibrillation) that did not result in a diagnosis (e.g., by a medical practitioner) of atrial fibrillation (e.g., to capture electrocardiograms showing features indicative of precursors to atrial fibrillation), as indicated in block 316. The analysis compute device 110, in the illustrative embodiment, obtains sets of testing data indicative of electrocardiograms for people without atrial fibrillation and electrocardiograms for people that were diagnosed with atrial fibrillation, as indicated in block 318. In the illustrative embodiment, and as indicated in block 320, the analysis compute device 110 obtains the training data and testing data in a ratio of approximately 70 to 30 (e.g., 70% training data and 30% testing data), as indicated in block 320. Subsequently, the method 300 advances to block 322 of FIG. 4, in which the analysis compute device 110 produces, from the training data, feature set data indicative of measured characteristics of each of the electrocardiograms (e.g., the electrocardiograms in the training data obtained in block 306 of FIG. 3).

Figure 4:
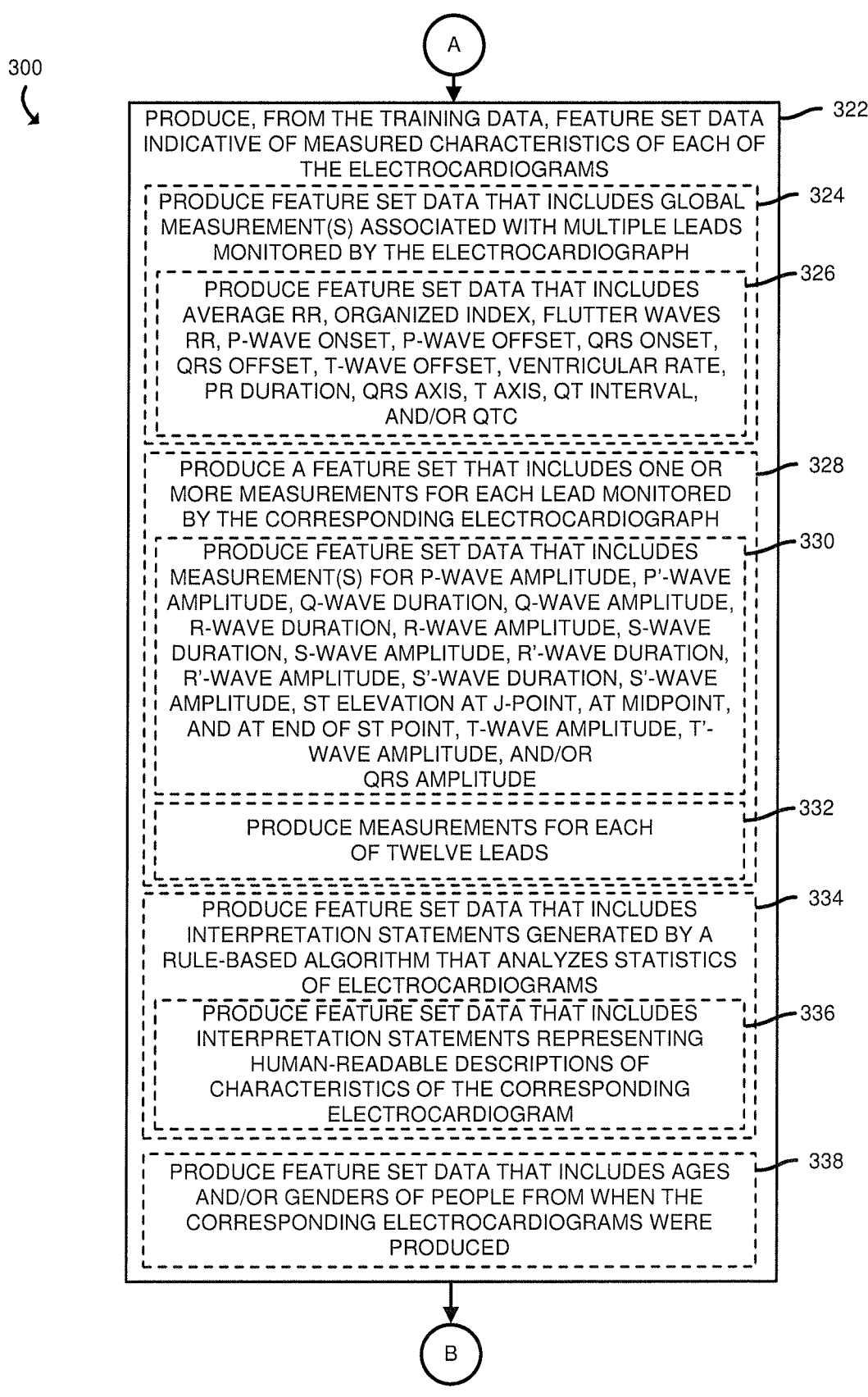

Referring now to FIG. 4, as indicated in block 324, the analysis compute device 110, in the illustrative embodiment, produces feature set data that includes one or more global measurements associated with multiple leads monitored by the corresponding electrocardiograph (e.g., that produced a given electrocardiogram in the training data). In doing so, the analysis compute device 110 may produce a feature set that includes one or more of average RR (e.g., interval between R-waves), organized index, flutter waves RR, P-wave onset, P-wave offset, QRS onset, QRS offset, T-wave offset, ventricular rate, PR duration, QRS axis, T axis, QT interval, or QTc, as indicated in block 326. As indicated in block 328, the analysis compute device 110, in the illustrative embodiment, also produces a feature set that includes one or more measurements for each lead monitored by the corresponding electrocardiograph (e.g., the electrocardiograph that produced a corresponding electrocardiogram in the training data). In doing so, the analysis compute device 110 may produce feature set data that includes one or more measurements for P-wave amplitude, P'-wave amplitude, Q-wave duration, Q-wave amplitude, R-wave duration, R-wave amplitude, S-wave duration, S-wave amplitude, R'-wave duration, R'-wave amplitude, S'-wave duration, S'-wave amplitude, ST elevation at J-point, at midpoint, and at end of ST point, T-wave amplitude, T'-wave amplitude, or QRS amplitude, as indicated in block 330. The analysis compute device 110, in the illustrative embodiment, produces the measurements for each of twelve leads, as indicated in block 332.

As indicated in block 334, the analysis compute device 110, in the illustrative embodiment, produces a feature set that includes interpretation statements generated by a rule-based algorithm that analyzes statistics of electrocardiograms. Relatedly, and as indicated in block 336, the analysis compute device 110 may produce a feature set that includes interpretation statements representing human-readable descriptions of characteristics of the corresponding electrocardiograms represented in the training data. For example, the analysis compute device 110 may obtain a feature set that includes human-readable interpretation statements produced by the VERITAS™ ECG algorithms from Hill-Rom, Inc. The analysis compute device 110, in the illustrative embodiment, also produces feature set data that includes ages and/or genders of the people corresponding to the electrocardiograms represented in the training data, as indicated in block 338. Subsequently, the method 300 advances to block 340 of FIG. 5, in which the analysis compute device 110 trains the prediction model based on the training data.

Figure 5:
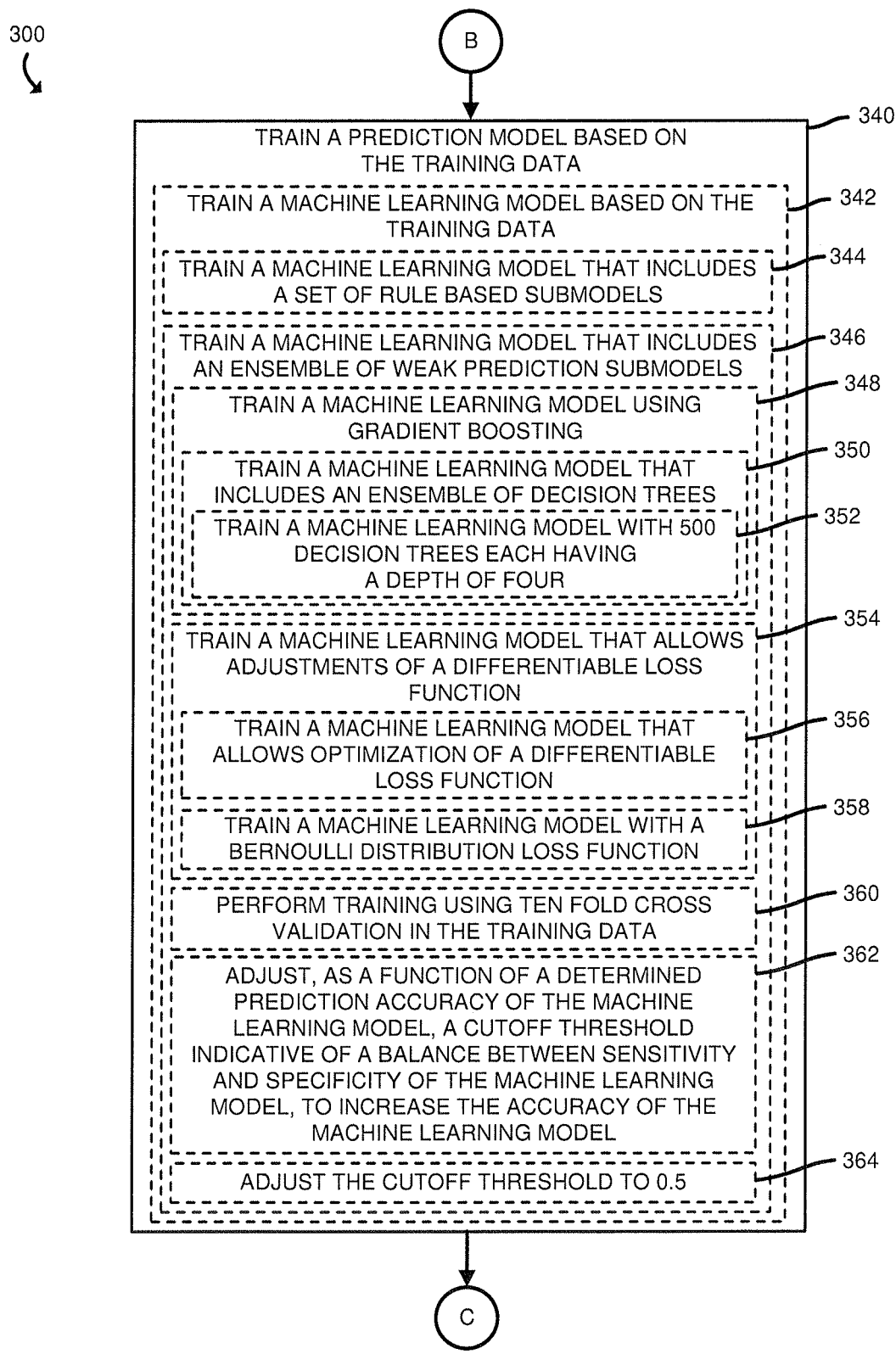

Referring now to FIG. 5, the analysis compute device 110, in the illustrative embodiment, trains a machine learning model based on the training data (e.g., the training data obtained in block 306 of FIG. 3), as indicated in block 342. In doing so, and as indicated in block 344, the analysis compute device 110 trains a machine learning model that includes a set of rule based submodels. As indicated in block 346, the analysis compute device 110 trains a machine learning model that includes an ensemble of weak prediction submodels (e.g., submodels that predict relatively poorly, with an accuracy in prediction that is slightly above random classification (e.g., slightly greater than 50% accuracy)). Specifically, in the illustrative embodiment and as indicated in block 348, the analysis compute device 110 trains a machine learning model (e.g., the prediction model) using gradient boosting in which layers of the ensemble of weak prediction submodels are built in a stage-wise fashion. As indicated in block 350, the analysis compute device 110 illustratively trains a machine learning model that includes an ensemble of decision trees (e.g., the weak prediction submodels are decision trees). Further, and as indicated in block 352, the analysis compute device 110, in the illustrative embodiment, trains the machine learning model (e.g., the prediction model) with approximately 500 decision trees, each having a depth of four.

As indicated in block 354, the analysis compute device 110 illustratively trains a machine learning model (e.g., the prediction model) that allows adjustments of a differentiable loss function. More specifically, and as indicated in block 356, the analysis compute device 110 trains a machine learning model that allows for optimization of the differentiable loss function. For example, and as indicated in block 358, the analysis compute device 110 may train a machine learning model with a Bernoulli distribution loss function. In the illustrative embodiment, the analysis compute device 110 performs the training using ten fold cross validation in the training data, as indicated in block 360. The analysis compute device 110, in the illustrative embodiment, adjusts, as a function of a determined prediction accuracy of the machine learning model (e.g., the prediction model), a cutoff threshold that is indicative of a balance between a sensitivity and a specificity of the machine learning model, to increase (e.g., optimize) the accuracy of the machine learning model (e.g., as determined by comparing predictions made by the machine learning model to actual results (e.g., whether the people actually developed atrial fibrillation) represented in the testing data). In the illustrative embodiment, the analysis compute device 110 may adjust the cutoff threshold to 0.5, as indicated in block 364, to obtain the most accurate predictions from the machine learning model (e.g., prediction model).

In an example implementation of the training process for a prediction model, a database of over 540,000 electrocardiograms was utilized. The database consisted of ten second long, twelve lead resting electrocardiograms, taken between 1980 and 2013 from 204,581 unique patients in the age range of 27 to 71, with a mean age of 49. A significant portion of the patients obtained serial electrocardiograms, with measurement intervals spanning from hours to years. The electrocardiograms were accompanied by "truth" medical interpretation (e.g., interpreted by a compute device executing electrocardiogram interpretation algorithm(s) and then reviewed and confirmed and/or edited by a physician). To train the machine learning model (e.g., the prediction model), the database (e.g., patient data) was reviewed to extract patients having multiple (e.g., serial) electrocardiograms. These patients were then categorized into two groups. Group A contained unique patients for which atrial fibrillation developed in time (e.g., atrial fibrillation was either annotated in the "truth" or interpreted with the electrocardiogram interpretation algorithm(s) at a point throughout the serial electrocardiograms, while all preceding in time electrocardiograms did not show atrial fibrillation). These patients were considered positive for the purpose of classification. Group B contained unique patients for which all serial electrocardiograms did not exhibit atrial fibrillation (e.g., both by the "truth" annotation as well as by execution of the algorithm(s) for interpreting electrocardiograms). These patients were considered negative for the purpose of classification.

After reviewing the entire database (e.g., patient data), 4,993 and 199,588 patients were categorized in the positive and negative groups (e.g., Groups A and B) respectively. The positive group was divided into training and testing sub-groups with a 70:30 ratio, resulting in 3,505 and 1,488 patients in the two sub-groups, respectively. The same number of patients were assigned to the negative and testing sub-groups, by random selection out of the 199,588 available patients. For the positive patients, the latest electrocardiogram record that did not exhibit atrial fibrillation was utilized for feature extraction, while for the negative patients, a random electrocardiogram record was utilized for that purpose. The feature set that was compiled for each record contained global measurements corresponding to those described with reference to block 326 of FIG. 4. The feature set also included per-lead measurements corresponding with those described with reference to block 330 of FIG. 4. Further, the feature set included a total of 303 binary interpretation statements produced through the execution of interpretation algorithm(s) (e.g., rule based algorithms) including interpretations regarding rhythm, conduction, and conclusions, similar to blocks 334 and 336 of FIG. 4. Additionally, the feature set included the age and sex of each patient represented in the electrocardiograms (e.g., patient data), similar to block 338 of FIG. 4.

Figure 10:
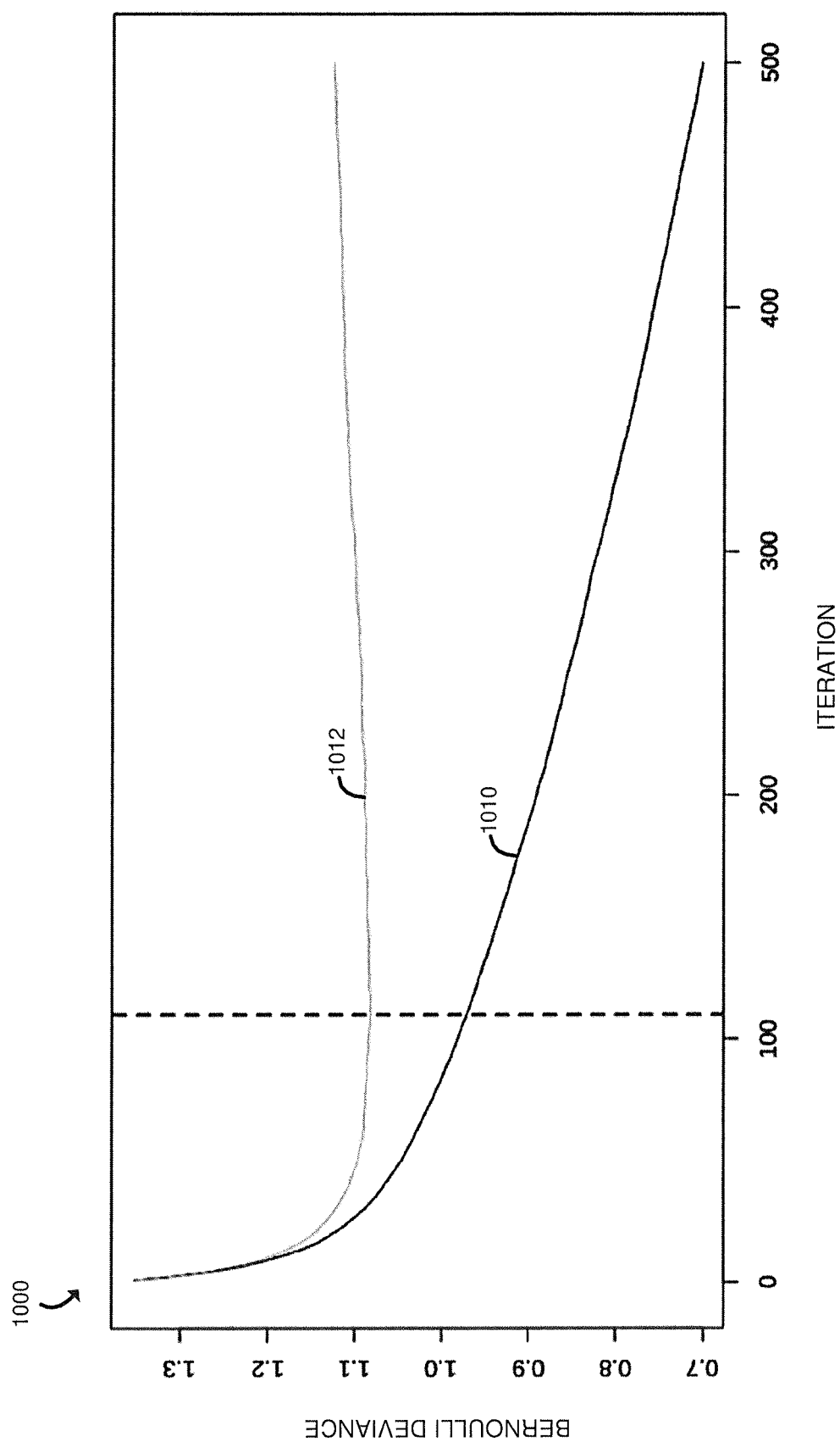
FIG. 10 is a chart of a deviance in a loss function over multiple training iterations for a gradient boosted prediction model used in an embodiment of the system of FIG. 1.

The feature set described above resulted in 547 features for each record in the training or testing set. Training of the machine learning model (e.g., prediction model) was performed using the "gbm" package in R-Studio, using a Bernoulli distribution loss function, with 500 trees to fit, with each tree having a depth of 4. Training was performed using 10-fold cross-validation on the training data. Referring now to FIG. 10, a chart 1000 illustrates the deviance of the loss function as a function of the number of iteration (e.g., tree). The performance for the training set and the performance for the validation set are shown by the lines 1010 and 1012 respectively. The resulting gradient boosted model (e.g., prediction model) exhibited the following relative influence of the features, with the ten most important features shown in the chart below:

CHART 1

| Ten Most Important Features | |
|---|---|
| Feature | Relative Influence |
| Age | 17.45 |
| P'-wave amplitude (aVR) | 4.19 |
| P-wave amplitude (I) | 1.97 |
| Average RR | 1.94 |
| P-wave amplitude (V3) | 1.94 |
| Interpretation Statement #31 - Frequent Supraventricular Premature Complexes | 1.31 |
| P-wave amplitude (V1) | 1.24 |
| P-wave amplitude (V2) | 1.20 |
| R-wave amplitude (II) | 1.09 |
| R-wave duration (II) | 1.08 |

Figure 11:
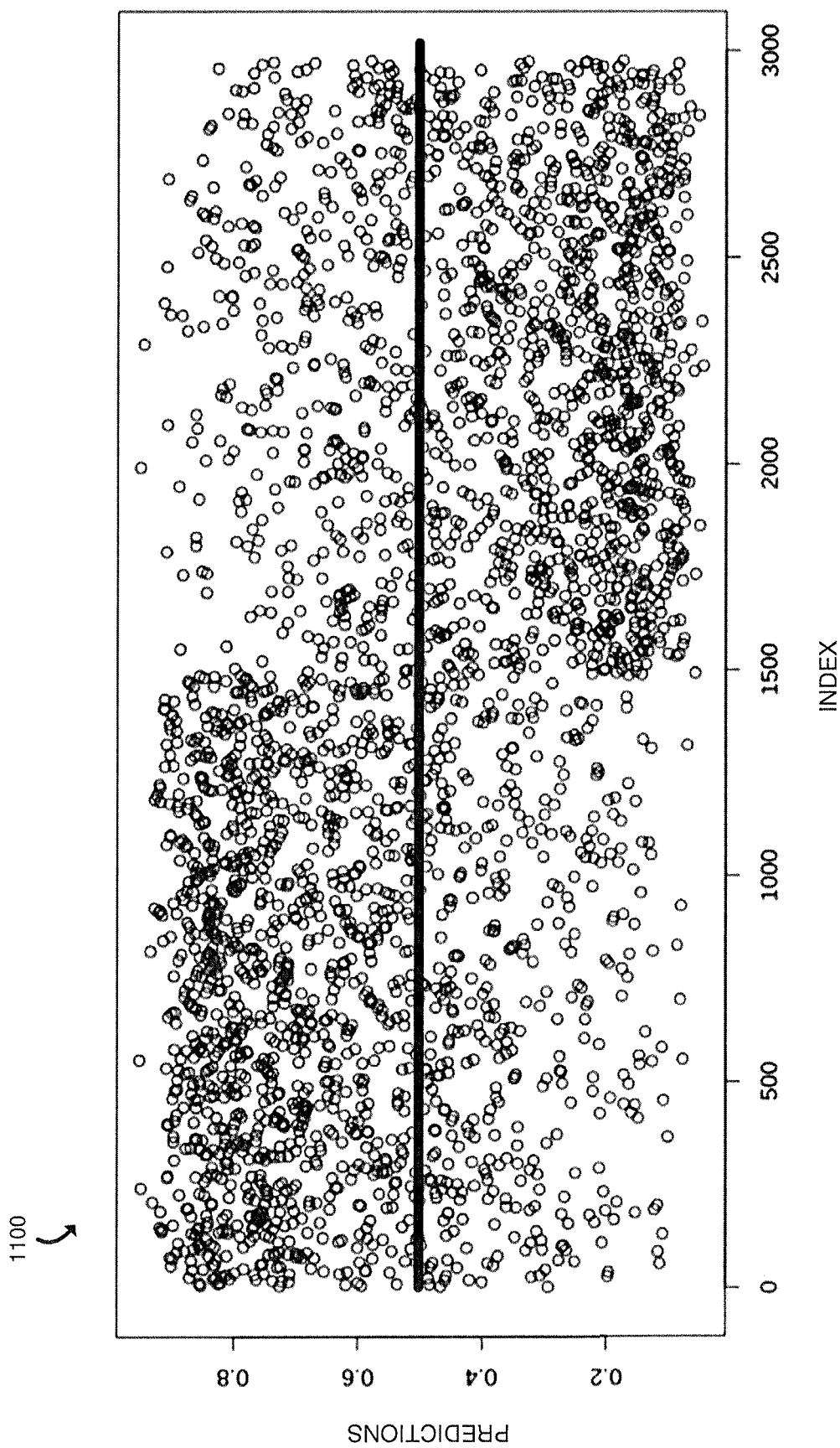
FIG. 11 is a chart of a performance of the prediction model used in an embodiment of the system of FIG. 1 in predicting the likelihoods that different patients will develop atrial fibrillation.
Figure 12:
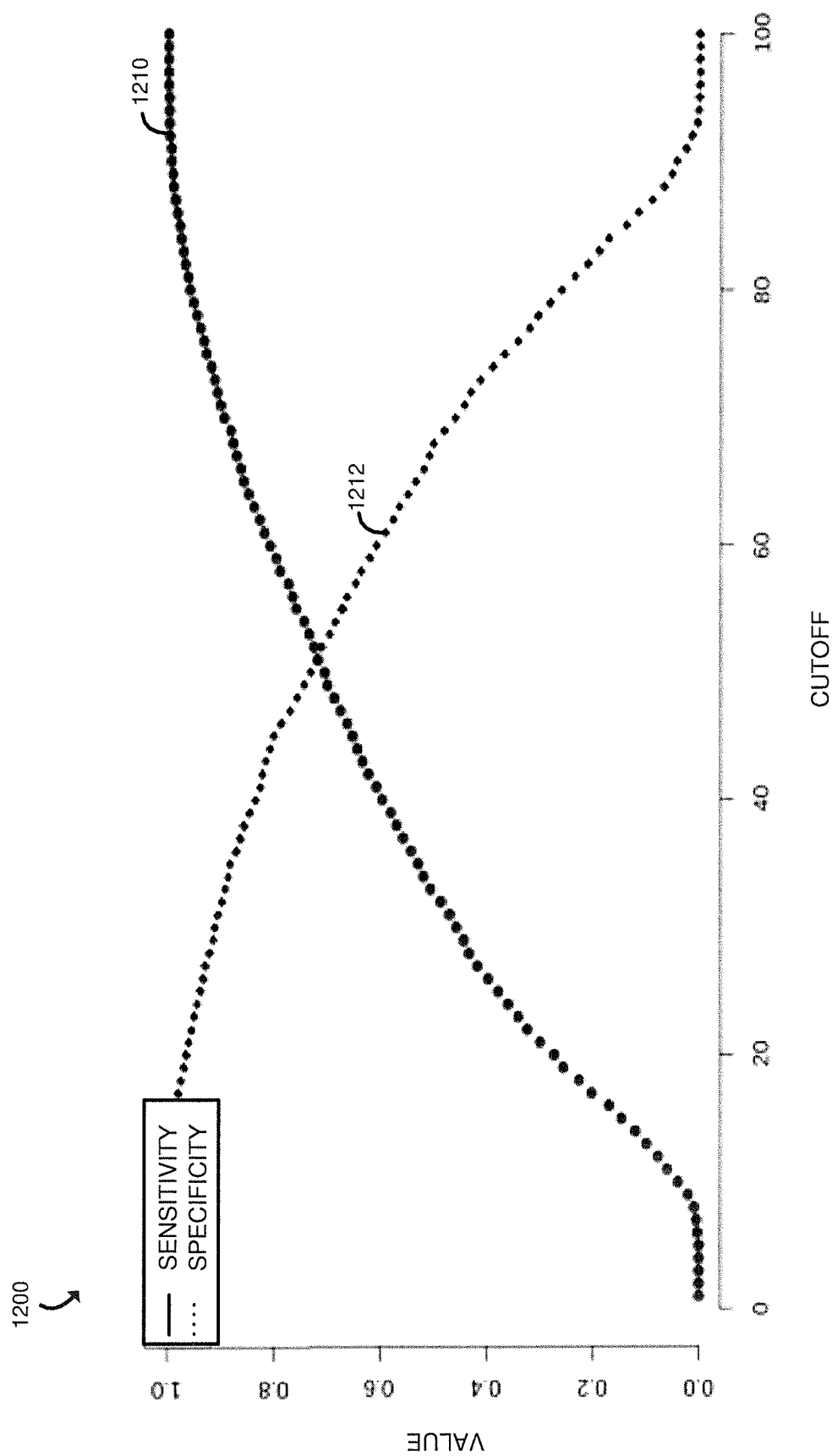
FIGS. 12 and 13 are charts of sensitivity and specificity of the prediction model, which may be controlled by an adjustable cutoff threshold in an embodiment of the system of FIG. 1.
Figure 13:
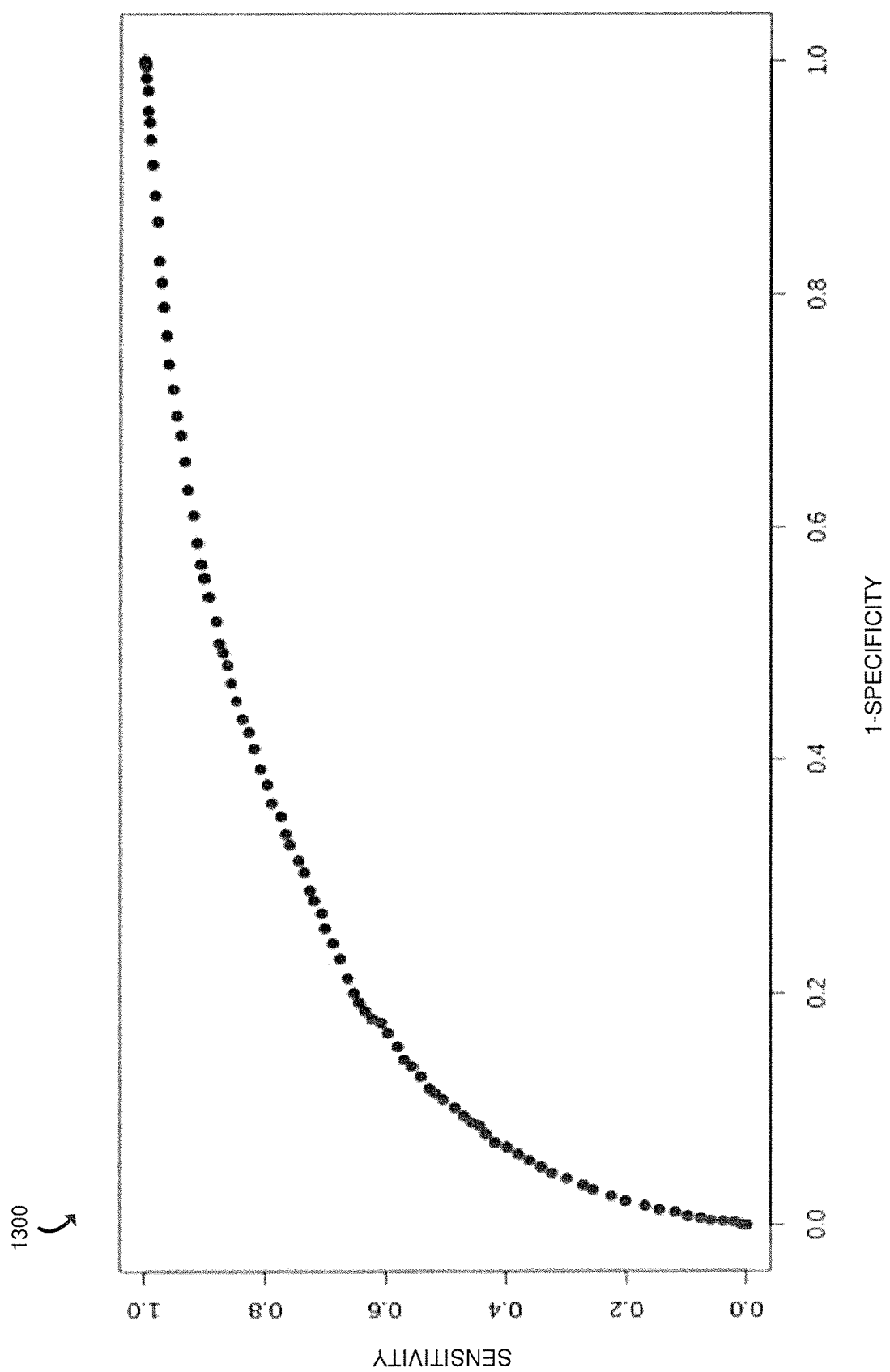

The results support the validity of the generated gradient boosted model (e.g., prediction model), as the majority of the most influential features are features of the atrial activity (e.g., P-wave measurements, supraventricular ectopic complexes), and age is an established predictor for many cardiovascular problems, including atrial fibrillation. The performance of the gradient boosted model (e.g., prediction model) was assessed using the testing set, which included records from patients that were not included in the training set. A total of 2,976 records were tested, half of which belonged to patients that later developed atrial fibrillation that was exhibited in subsequent electrocardiograms, and the other half from patients that did not subsequently develop atrial fibrillation (e.g., in subsequent electrocardiograms). Referring now to FIG. 11, a chart 1100 illustrates the output of the gradient boosted model (e.g., prediction model) for the test records. In the chart 1100, prediction is shown as the probability to develop atrial fibrillation in the future. The scatter plot depicted in the chart 1100 clearly shows that the first half of records obtain a higher center-of-mass, tending to yield a higher gradient boosted model (e.g., prediction model) output (e.g., higher likelihood to develop future atrial fibrillation) than the other half of the records. By setting a varying classification threshold and calculating the confusion matrix for each threshold and its corresponding sensitivity and specificity values, the behavior depicted in the chart 1200 of FIG. 12 and the chart 1300 of FIG. 13 was produced. In the chart 1200 of FIG. 12, the line 1210 represents sensitivity and the line 1212 represents specificity. For a cutoff threshold of 0.5, the following confusion matrix and performance were obtained.

CHART 2

| Confusion Matrix | | |
|---|---|---|
| | Reference | |
| Prediction | 0 | 1 |
| 0 | 1,066 | 399 |
| 1 | 422 | 1,089 |

CHART 3

| Performance | |
|---|---|
| Accuracy | 0.7241 |
| 95% CI | (0.7077, 0.7401) |
| P-Value [Acc > NIR] | <2e−16 |
| Kappa | 0.4483 |
| Specificity | 0.7164 |
| Sensitivity | 0.7319 |
| Negative Pred. Value | 0.7276 |
| Positive Pred. Value | 0.7207 |
| Balanced Accuracy | 0.7241 |

Figure 6:
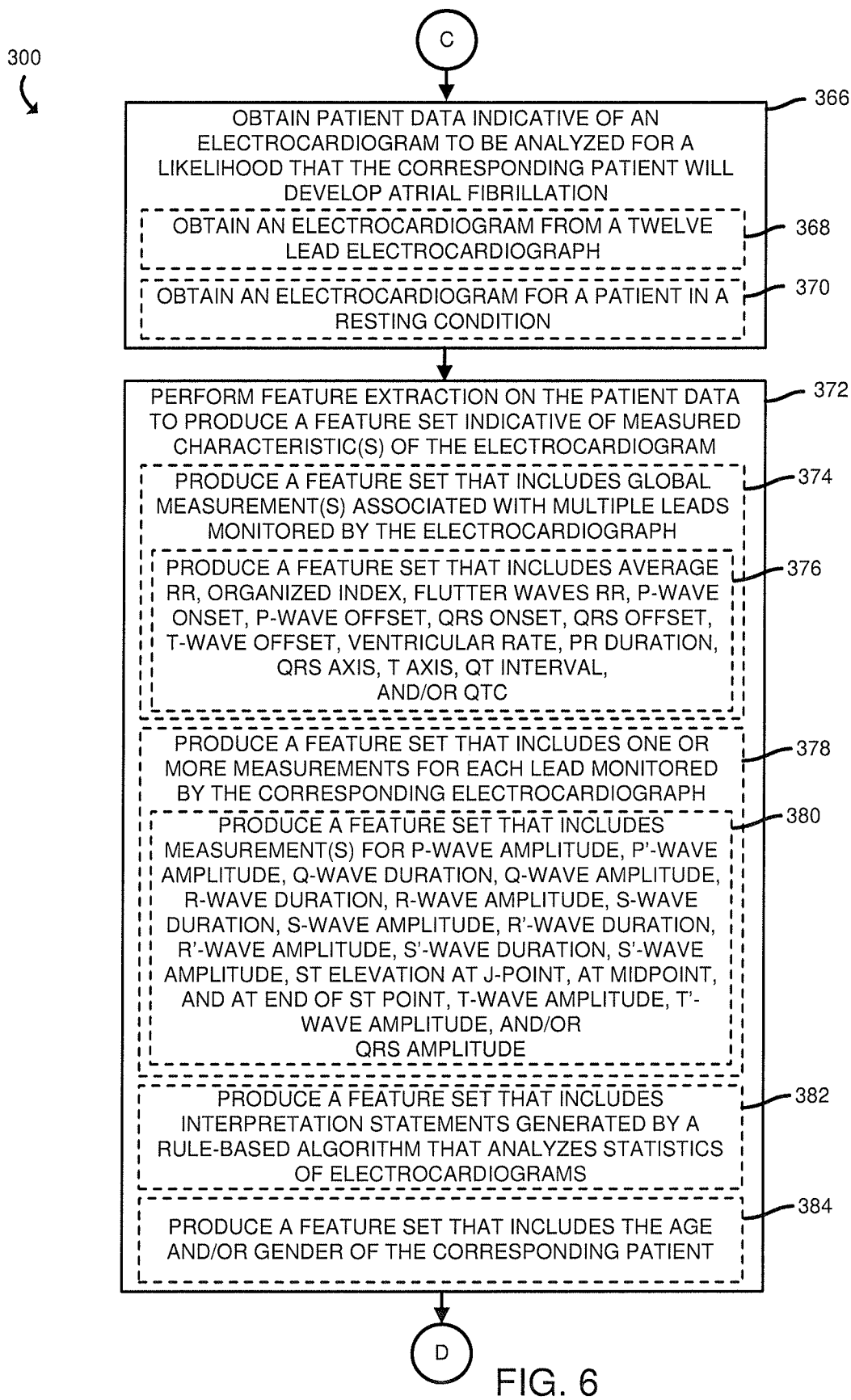

Referring back to the method 300, after training the machine learning model (e.g., prediction model), or if the machine learning model has already been trained in block 304 of FIG. 3, the method 300 advances to block 366 of FIG. 6, in which the analysis compute device 110 obtains patient data indicative of an electrocardiogram to be analyzed for a likelihood (e.g., risk, probability, etc.) that the corresponding patient (e.g., the patient 130 in FIG. 1) will develop atrial fibrillation.

Referring now to FIG. 6, in obtaining the patient data indicative of an electrocardiogram, the analysis compute device 110, in the illustrative embodiment, obtains the electrocardiogram from a twelve lead electrocardiograph (e.g., from the electrocardiograph 112 in FIG. 1), as indicated in block 368. In some embodiments, the analysis compute device 110 does not obtain the electrocardiogram directly from the electrocardiograph. Rather, in such embodiments, the analysis compute device 110 may obtain the electrocardiogram from another source, such as the electronic medical records system 116. As indicated in block 370, the analysis compute device 110, in the illustrative embodiment, obtains an electrocardiogram for a patient (e.g., the patient 130) that is in a resting condition (e.g., laying down, not exercising, etc.).

Subsequently, and as indicated in block 372, the analysis compute device 110 performs feature extraction on the patient data (e.g., the obtained electrocardiogram from block 366) to produce a feature set that is indicative of one or more measured characteristics of the electrocardiogram. In doing so, and as indicated in block 374, the analysis compute device 110 may produce a feature set that includes one or more global measurements associated with multiple leads monitored by the corresponding electrocardiograph (e.g., the electrocardiograph 112). Specifically, and as indicated in block 376, the analysis compute device 110 may produce a feature set that includes one or more of average RR (e.g., interval between R-waves), organized index, flutter waves RR, P-wave onset, P-wave offset, QRS onset, QRS offset, T-wave offset, ventricular rate, PR duration, QRS axis, T axis, QT interval, or QTc. The analysis compute device 110 may additionally or alternatively produce a feature set that includes one or more measurements for each lead monitored by the corresponding electrocardiograph (e.g., the electrocardiograph 112), as indicated in block 378. In doing so, the analysis compute device 110 may produce feature set data that includes one or more measurements for P-wave amplitude, P'-wave amplitude, Q-wave duration, Q-wave amplitude, R-wave duration, R-wave amplitude, S-wave duration, S-wave amplitude, R'-wave duration, R'-wave amplitude, S'-wave duration, S'-wave amplitude, ST elevation at J-point, at midpoint, and at end of ST point, T-wave amplitude, T'-wave amplitude, or QRS amplitude, as indicated in block 380.

Additionally or alternatively, in performing the feature extraction, the analysis compute device 110 may produce a feature set that includes one or more interpretation statements generated by one or more rule-based algorithms that analyze statistics of an electrocardiogram to produce interpretation statement(s) (e.g., the VERITAS™ ECG algorithms from Hill-Rom, Inc.), as indicated in block 382. In producing the feature set, the analysis compute device 110 may produce a feature set that also includes the age and/or gender of the corresponding patient (e.g., the patient 130), as indicated in block 384. Subsequently, the method 300 advances to block 386 of FIG. 7, in which the analysis compute device 110 determines, based on the patient data and the trained prediction model, a likelihood (e.g., risk, probability, etc.) that the patient (e.g., the patient 130) will develop atrial fibrillation.

Figure 7:
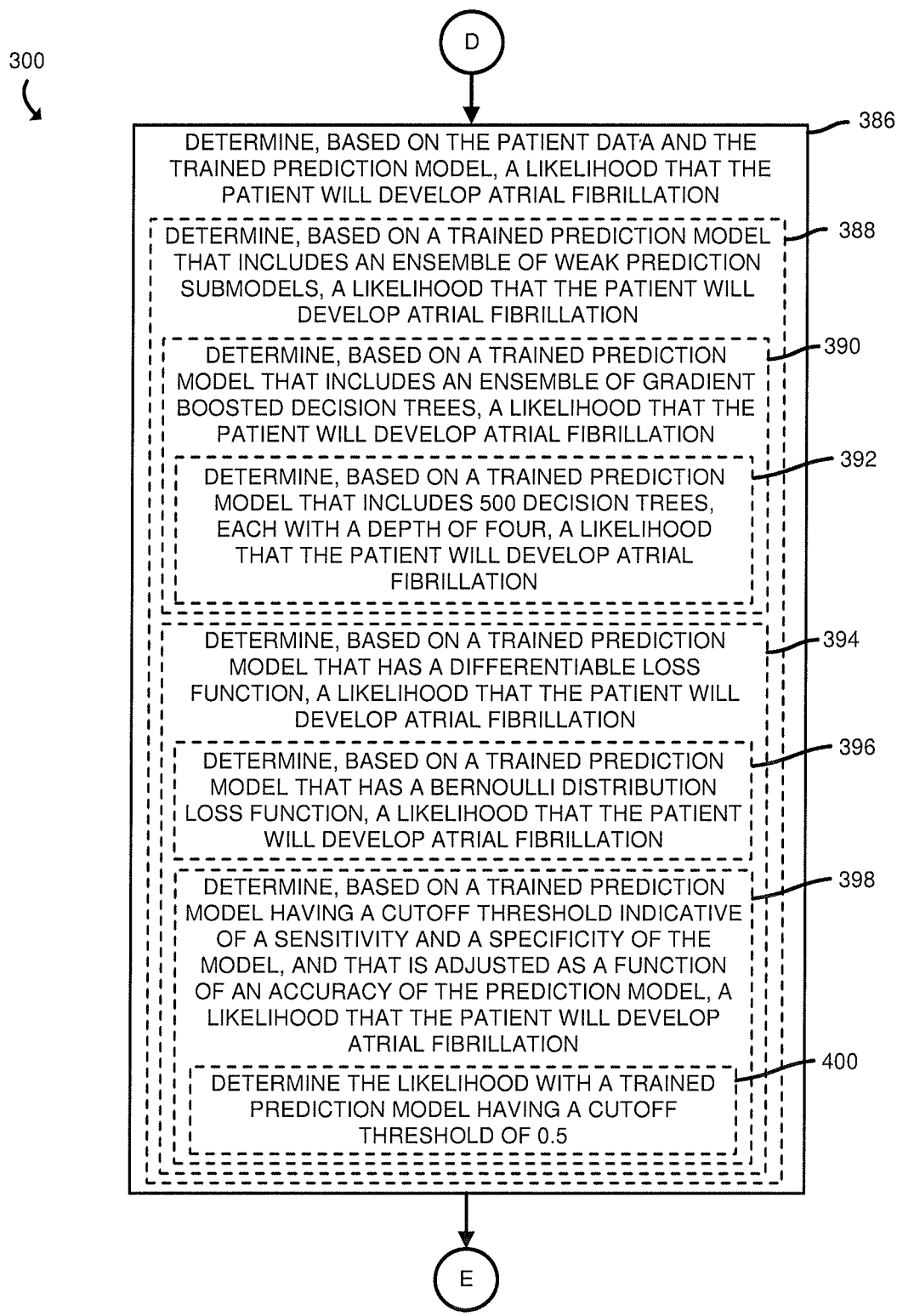

Referring now to FIG. 7, in determining a likelihood that the patient will develop atrial fibrillation, the analysis compute device 110, in the illustrative embodiment, determines the likelihood based on (e.g., using) a trained prediction model that includes an ensemble of weak prediction submodels (e.g., the weak prediction submodels of block 346 of FIG. 5), as indicated in block 388. In doing so, and as indicated in block 390, the analysis compute device 110, in the illustrative embodiment, determines, based on a trained prediction model that includes an ensemble of gradient boosted decision trees, a likelihood that the patient (e.g., the patient 130) will develop atrial fibrillation. As indicated in block 392, the analysis compute device 110 may determine the likelihood that the patient will develop atrial fibrillation based on a trained prediction model that includes approximately 500 decision trees, each with a depth of four (e.g., the prediction model trained in block 352 of FIG. 5).

The analysis compute device 110, in the illustrative embodiment, determines, based on (e.g., using) a trained prediction model that has a differential loss function, the likelihood that the patient (e.g., the patient 130) will develop atrial fibrillation, as indicated in block 394. More specifically, in the illustrative embodiment, the analysis compute device 110 determines, based on a train prediction model that has a Bernoulli distribution loss function, the likelihood that the patient will develop atrial fibrillation, as indicated in block 396. Further, the analysis compute device 110 illustratively determines the likelihood that the patient will develop atrial fibrillation based on a trained prediction model having a cutoff threshold indicative of a sensitivity and a specificity of the model, and that is adjusted as a function of an accuracy of the prediction model (e.g., as adjusted in block 362 of FIG. 5), as indicated in block 398. The cutoff threshold may, in the illustrative embodiment, be adjusted to approximately 0.5, as indicated in block 400 (e.g., to optimize the accuracy of the prediction model). Subsequently, the method 300 advances to block 402 of FIG. 8, in which the analysis compute device 110 presents the determined likelihood that the patient will develop atrial fibrillation.

Figure 8:
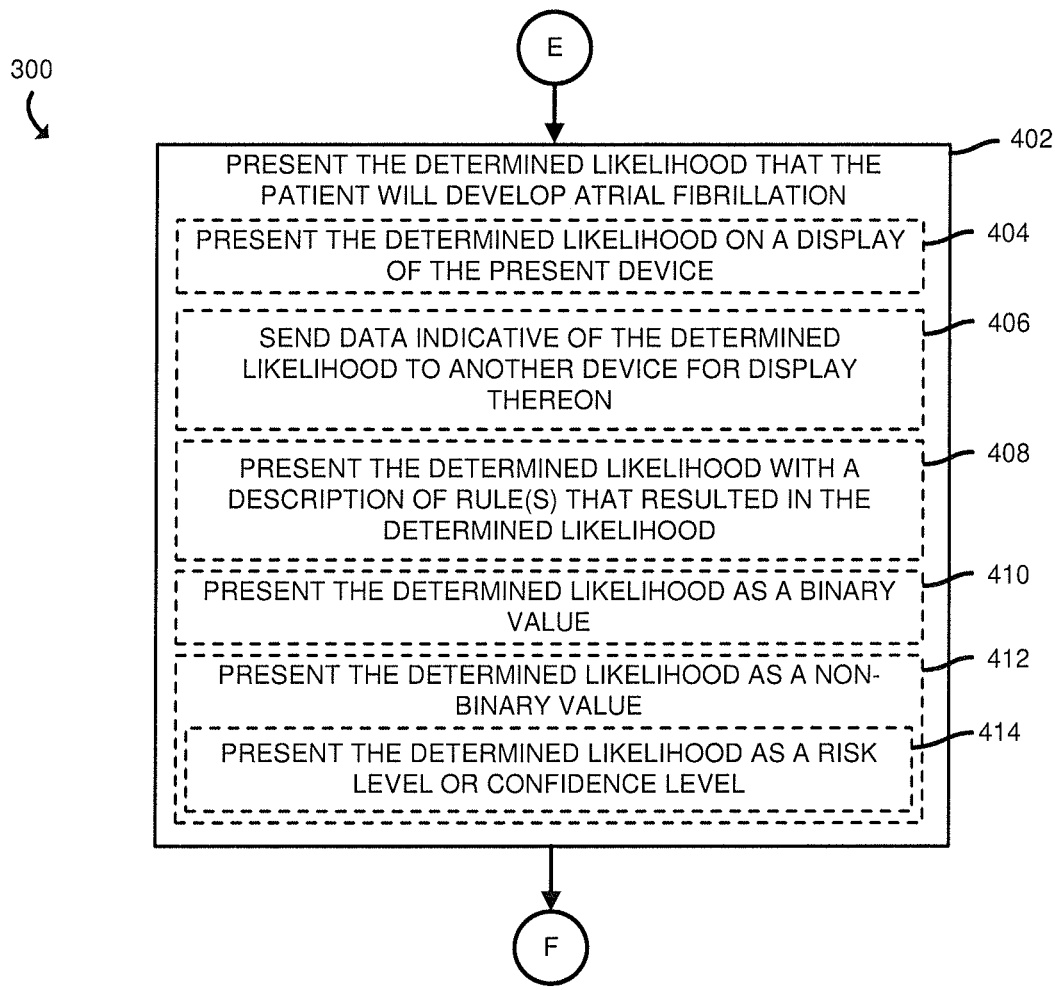

Referring now to FIG. 8, in some embodiments, the analysis compute device 110 may present the determined likelihood (e.g., that the patient 130 will develop atrial fibrillation) on a display (e.g., the display device 214) of the analysis compute device 110, as indicated in block 404. Additionally or alternatively, the analysis compute device 110 may send data indicative of the determined likelihood to another device (e.g., for display thereon), as indicated in block 406. For example, the analysis compute device 110 may send the data to the caregiver compute device 114 and/or to the electronic medical records system 116, which may also store the data as a medical record in association with the patient (e.g., the patient 130). In some embodiments and as indicated in block 408, the analysis compute device 110 may present the determined likelihood with a description of one or more rules (e.g., identifiers of branches of the decision trees involved in the determination of the likelihood that the patient 130 will develop atrial fibrillation, one or more of the interpretation statements produced in block 382 of FIG. 6, etc.) that resulted in (e.g., lead to) the determined likelihood that the patient 130 will develop atrial fibrillation.

In some embodiments, the analysis compute device 110 may present the determined likelihood as a binary value (e.g., yes, no, positive, negative, etc.), as indicated in block 410. In other embodiments, the analysis compute device 110 may provide a more nuanced output, by presenting the determined likelihood as a non-binary value, as indicated in block 412. For example, and as indicated in block 414, the analysis compute device 110 may present the determined likelihood as a risk level or confidence level (e.g., as a value between 0 and 1). Subsequently, the method 300 loops back to block 302 of FIG. 3 to potentially determine the likelihood of another patient developing atrial fibrillation.

Although the method 300 is described above as being performed by the analysis compute device 110 of FIG. 1, in other embodiments, one or more of the operations of the method 300 may be performed by another device (e.g., the training of the prediction model may be performed by another device). Further, while the operations are shown and described in a particular order, for simplicity, it should be understood that in some embodiments, one or more of the operations of the method 300 may be executed in a different order or concurrently.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A system comprising:
an electrocardiograph having a plurality of electrodes configured to be placed on a patient;
a compute device communicatively coupled to the electrocardiograph via a network of a healthcare facility, the compute device including circuitry configured to:
obtain patient data from the electrocardiograph to create an electrocardiogram to be analyzed for a likelihood that a corresponding patient will develop atrial fibrillation; and
determine, based on the patient data and execution by the circuitry of a prediction model that is provided in the circuitry and that includes a plurality of gradient boosted weak prediction submodels, the likelihood that the patient will develop atrial fibrillation; and
train the prediction model using a ten fold cross validation operation; and
a caregiver compute device communicatively coupled to the compute device via the network of the facility, wherein the caregiver compute device is configured to receive information from the compute device indicative of the likelihood that the corresponding patient will develop atrial fibrillation, display the information, and receive inputs from a caregiver to (i) order tests for the corresponding patient and (ii) place the patient on a treatment program to lower the risk of developing atrial fibrillation.

2. The system of claim 1, wherein to determine, based on the patient data and execution by the circuitry of the prediction model that includes the plurality of gradient boosted weak prediction submodels, the likelihood that the patient will develop atrial fibrillation comprises to determine the likelihood that the patient will develop atrial fibrillation using the prediction model that includes a plurality of gradient boosted decision trees.

3. The system of claim 2, wherein to determine the likelihood using the prediction model that includes the plurality of gradient boosted decision trees comprises to determine the likelihood using the prediction model that includes at least 500 gradient boosted decisions trees, wherein each of the decision trees has a depth of at least four.

4. The system of claim 1, wherein to determine, based on the patient data and the prediction model that includes a plurality of gradient boosted weak prediction submodels, the likelihood that the patient will develop atrial fibrillation comprises to determine the likelihood using the prediction model that has a differentiable loss function.

5. The system of claim 1, wherein to determine, based on the patient data and the prediction model that includes a plurality of gradient boosted weak prediction submodels, the likelihood that the patient will develop atrial fibrillation comprises to determine the likelihood using the prediction model that has a Bernoulli distribution loss function.

6. The system of claim 1, wherein to determine, based on the patient data and the prediction model that includes a plurality of gradient boosted weak prediction submodels, the likelihood that the patient will develop atrial fibrillation comprises to determine the likelihood using the prediction model having a cutoff threshold indicative of a sensitivity and a specificity of the prediction model, wherein the cutoff threshold is adjusted as a function of an accuracy of the prediction model.

7. The system of claim 6, wherein the cutoff threshold is equal to 0.5.

8. The system of claim 1, wherein the circuitry is further configured to perform feature extraction on the patient data to produce a feature set that is indicative of one or more measured characteristics of the electrocardiogram.

9. The system of claim 8, wherein to perform feature extraction comprises to produce a feature set that includes at least one global measurement associated with multiple leads monitored by the electrocardiograph corresponding to the electrocardiogram.

10. The system of claim 9, wherein to produce a feature set that includes at least one global measurement comprises to produce a feature set that includes at least one of an average RR, an organized index, flutter waves RR, a P-wave onset, a P-wave offset, a QRS onset, a QRS offset, a T-wave offset, a ventricular rate, a PR duration, a QRS axis, a T axis, a QT interval, or a QTc.

11. The system of claim 8, wherein to perform feature extraction comprises to produce the feature set that includes at least one measurement obtained by each electrode of the plurality of electrodes of the electrocardiograph that creates the electrocardiogram.

12. The system of claim 11, wherein to produce the feature set comprises to produce the feature set that includes one or more measurements for a P-wave amplitude, a P'-wave amplitude, a Q-wave duration, a Q-wave amplitude, an R-wave duration, an R-wave amplitude, an S-wave duration, an S-wave amplitude, an R'-wave duration, an R'-wave amplitude, an S'-wave duration, an S'-wave amplitude, an ST elevation at a J-point, at a midpoint, and at an end of an ST point, a T-wave amplitude, a T'-wave amplitude, or a QRS amplitude.

13. The system of claim 8, wherein to produce the feature set comprises to produce the feature set that includes interpretation statements generated by an algorithm that analyzes statistics of the electrocardiograms.

14. The system of claim 8, wherein to produce the feature set comprises to produce the feature set that includes at least one of an age or a gender of the patient.

15. The system of claim 1, wherein the circuitry is further configured to:
obtain training data corresponding to electrocardiograms for multiple people;
produce, from the training data, feature set data including characteristics of each of the electrocardiograms; and
train the prediction model based on the training data.

16. The system of claim 15, wherein to obtain the training data comprises to obtain some of the electrocardiograms for a set of people subsequently diagnosed with atrial fibrillation by a medical practitioner.

17. The system of claim 16, wherein the circuitry is further configured to:
obtain a set of testing data indicative of electrocardiograms for people without atrial fibrillation and electrocardiograms for people diagnosed with atrial fibrillation, wherein the training data and the testing data are obtained in a ratio of approximately 70 to 30.

18. A method comprising:
providing an electrocardiograph having a plurality of electrodes;
placing the plurality of electrodes on a patient;
providing a compute device and training a prediction model of the compute device using a ten fold cross validation operation;
communicatively coupling the compute device to the electrocardiograph via a network of a healthcare facility;
obtaining, by the compute device, patient data from the electrocardiograph indicative of an electrocardiogram to be analyzed for a likelihood that a corresponding patient will develop atrial fibrillation;
determining, by the compute device and based on the patient data and execution by the compute device of the prediction model that includes a plurality of gradient boosted weak prediction submodels, the likelihood that the patient will develop atrial fibrillation;
communicatively coupling a caregiver compute device to the compute device via the network of the facility;
receiving at the caregiver compute device from the compute device information indicative of the likelihood that the corresponding patient will develop atrial fibrillation;
displaying the information on the caregiver compute device; and
receiving inputs from a caregiver via the caregiver compute device to (i) order tests for the corresponding patient and (ii) place the patient on a treatment program to lower the risk of developing atrial fibrillation.

19. One or more non-transitory machine-readable storage media comprising a plurality of instructions stored thereon that, in response to being executed, cause a system to:
operate an electrocardiograph having a plurality of electrodes that are placed on a patient,
operate a compute device that is communicatively coupled to the electrocardiograph via a network of a healthcare facility, and train a prediction model of the compute device using a ten fold cross validation operation;
obtain with the compute device patient data from the electrocardiograph including an electrocardiogram to be analyzed for a likelihood that a corresponding patient will develop atrial fibrillation;
determine, based on the patient data and execution by the compute device of the prediction model that includes a plurality of gradient boosted weak prediction submodels, the likelihood that the patient will develop atrial fibrillation;
operate a caregiver compute device that is communicatively coupled to the compute device via the network of the facility;
receive at the caregiver compute device from the compute device information indicative of the likelihood that the corresponding patient will develop atrial fibrillation;
display the information on the caregiver compute device; and
receive inputs from a caregiver via the caregiver compute device to (i) order tests for the corresponding patient and (ii) place the patient on a treatment program to lower the risk of developing atrial fibrillation.

\* \* \* \* \*